July 4, 1950　　　　　R. E. GILMAN　　　　2,513,307
CODING MEANS AND METHOD
Filed May 2, 1946　　　　　　　　　　　　13 Sheets-Sheet 1
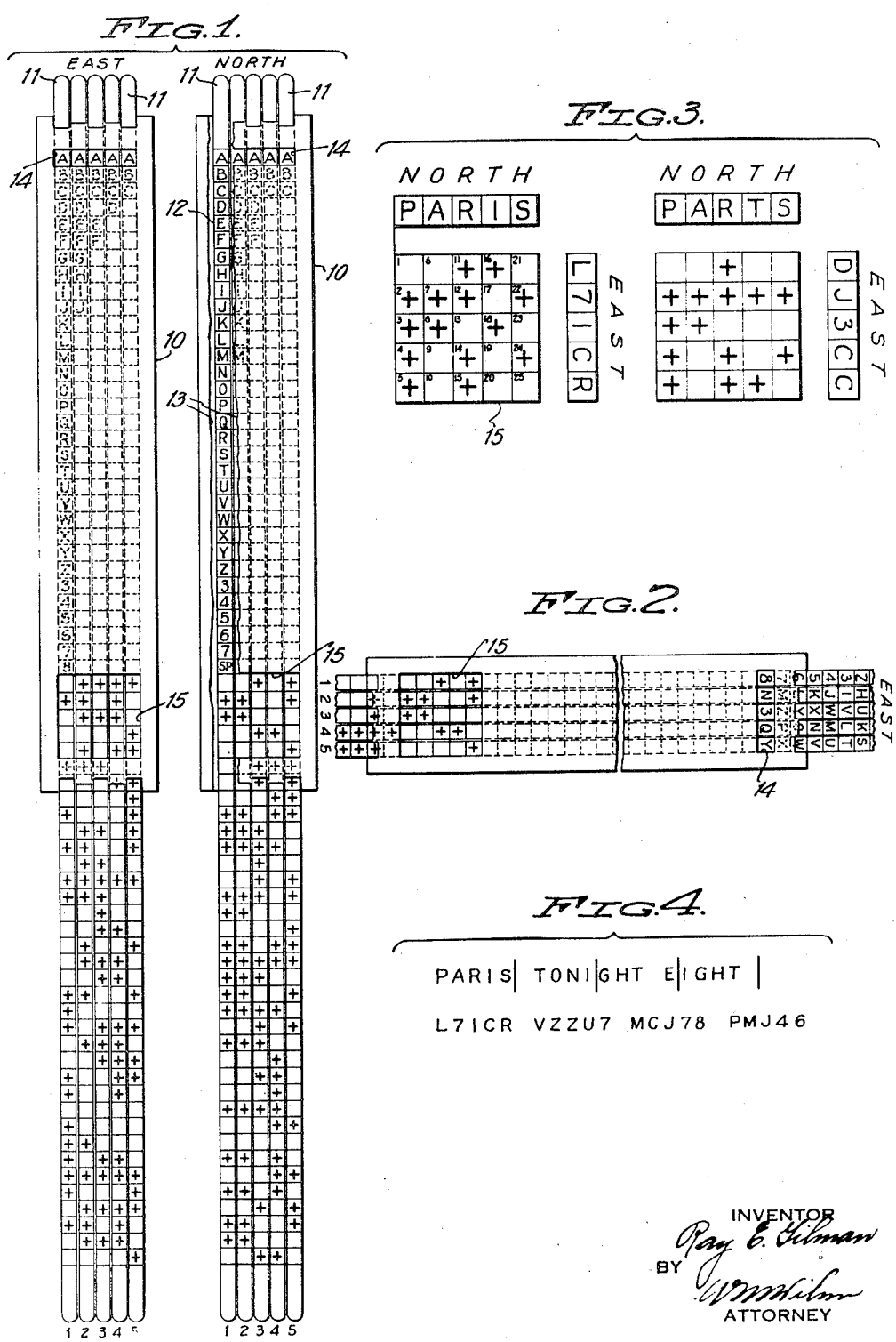

July 4, 1950  R. E. GILMAN  2,513,307
CODING MEANS AND METHOD
Filed May 2, 1946  13 Sheets-Sheet 2

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|----|----|----|----|----|----|----|----|----|----|----|----|----|----|----|----|----|----|----|----|----|----|----|
| A | 1 | 1 | 1 | 2 |   | 2 |   |   | 1 | 1  | 1  | 2  |    | 2  |    | 1  | 3  |    |    | 3  |    |    | 1  | 5  |    |    |    | 5  |    |    |    |    |
| B | 1 | 0 | 1 | 0 | 0 | 1 | 1 | 0 | 1 | 0  | 1  | 1  | 0  | 0  | 1  | 0  | 0  | 0  | 1  | 1. | 1  | 0  | 1  | 1  | 1  | 1  | 1  | 0  | 0  | 0  | 0  | 0  |
| C | 1 | 2 | 5 | 10 | 4 | 9 | 3 | 6 | 13 | 10 | 5 | 11 | 6 | 12 | 9 | 2 | 4 | 8 | 1 | 3 | 7 | 14 | 13 | 11 | 7 | 15 | 15 | 14 | 12 | 8 | 0 | 0 |
| D | 1 | 2 | 5 | 10 | 5 | 11 | 6 | 12 | 9 | 2 | 4 | 9 | 3 | 6 | 13 | 10 | 4 | 8 | 1 | 3 | 7 | 14 | 13 | 11 | 7 | 15 | 15 | 14 | 12 | 8 | 0 | 0 |
| E | 1 | 0 | 1 | 0 | 1 | 1 | 0 | 0 | 1 | 0 | 0 | 1 | 1 | 0 | 1 | 0 | 0 | 0 | 1 | 1 | 1 | 0 | 1 | 1 | 1 | 1 | 1 | 0 | 0 | 0 | 0 | 0 |
| F | 1 | 2 | 5 | 10 | 5 | 11 | 7 | 15 | 15 | 14 | 12 | 8 | 1 | 3 | 7 | 14 | 13 | 11 | 6 | 12 | 9 | 2 | 4 | 9 | 3 | 6 | 13 | 10 | 4 | 8 | 0 | 0 |
| G | 1 | 0 | 1 | 0 | 1 | 1 | 1 | 1 | 1 | 0 | 0 | 0 | 1 | 1 | 1 | 0 | 1 | 1 | 0 | 0 | 1 | 0 | 0 | 1 | 1 | 0 | 1 | 0 | 0 | 0 | 0 | 0 |

| B' | + | + |   |   | + | + |   | + |   | + | + |    |    | +  |    |    |    | +  | +  | +  |    | +  | +  | +  | +  | +  |    |    |    |    | +  |   | + |    |    | SP |
|----|---|---|---|---|---|---|---|---|---|---|---|----|----|----|----|----|----|----|----|----|----|----|----|----|----|----|----|----|----|----|----|---|---|----|----|----|
|    | 1 | 2 | 3 | 4 | 5 | 6 | 7 | 8 | 9 | 10| 11| 12 | 13 | 14 | 15 | 16 | 17 | 18 | 19 | 20 | 21 | 22 | 23 | 24 | 25 | 26 | 27 | 28 | 29 | 30 | 31 | 32| 33| 34 | 35 | 36 | 37 |

| H | 1 | 0 | 0 | 0 | 0 | 0 | 1 | 0 | 0 | 1 | 0 | 1 | 1 | 0 | 0 | 1 | 1 | 1 | 1 | 1 | 0 | 0 | 0 | 1 | 1 | 0 | 1 | 1 | 1 | 0 | 1 | 0 |
| I | 5 | 10 | 4 | 8 | 0 | 0 | 1 | 2 | 4 | 9 | 2 | 5 | 11 | 6 | 12 | 9 | 3 | 7 | 15 | 15 | 14 | 12 | 8 | 1 | 3 | 6 | 13 | 11 | 7 | 14 | 13 | 10 |
| J | 5 | 11 | 6 | 12 | 9 | 3 | 7 | 15 | 15 | 14 | 12 | 8 | 1 | 3 | 6 | 13 | 11 | 7 | 14 | 13 | 10 | 4 | 8 | 0 | 0 | 1 | 2 | 4 | 9 | 2 | 5 | 10 |
| K | 1 | 1 | 0 | 0 | 1 | 1 | 1 | 1 | 1 | 0 | 0 | 0 | 1 | 1 | 0 | 1 | 1 | 1 | 0 | 1 | 0 | 0 | 0 | 0 | 0 | 1 | 0 | 0 | 1 | 0 | 1 | 0 |
| L | 5 | 11 | 7 | 14 | 13 | 10 | 4 | 8 | 0 | 0 | 1 | 2 | 4 | 9 | 3 | 7 | 15 | 15 | 14 | 12 | 8 | 1 | 3 | 6 | 13 | 11 | 6 | 12 | 9 | 2 | 5 | 10 |
| M | 1 | 1 | 1 | 0 | 1 | 0 | 0 | 0 | 0 | 0 | 1 | 0 | 0 | 1 | 1 | 1 | 1 | 1 | 0 | 0 | 0 | 1 | 1 | 0 | 1 | 1 | 0 | 0 | 1 | 0 | 1 | 0 |

INVENTOR
Ray E. Gilman
BY
ATTORNEY

July 4, 1950 R. E. GILMAN 2,513,307
CODING MEANS AND METHOD
Filed May 2, 1946 13 Sheets-Sheet 3
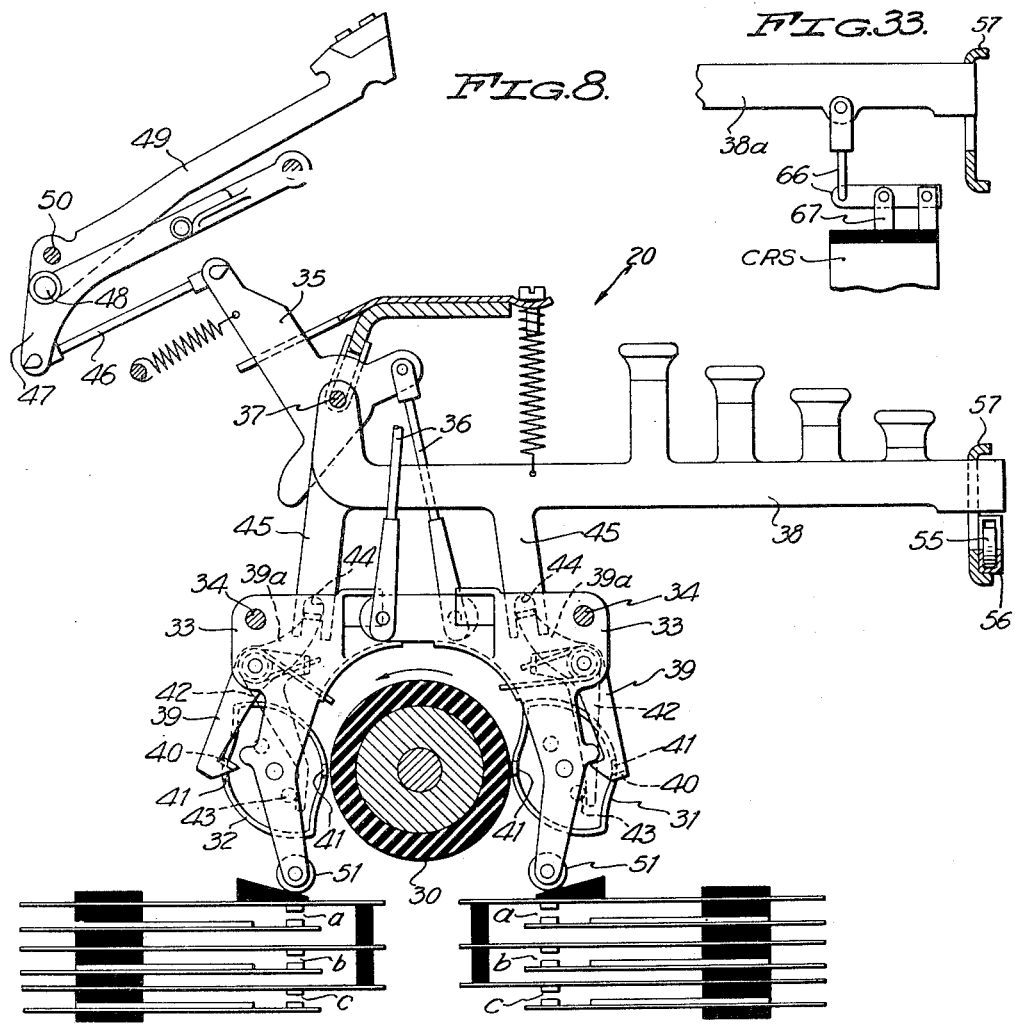
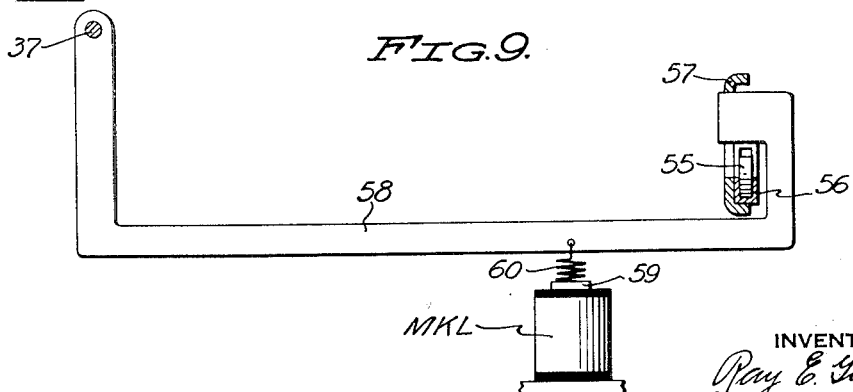
INVENTOR
Ray E. Gilman
BY
ATTORNEY

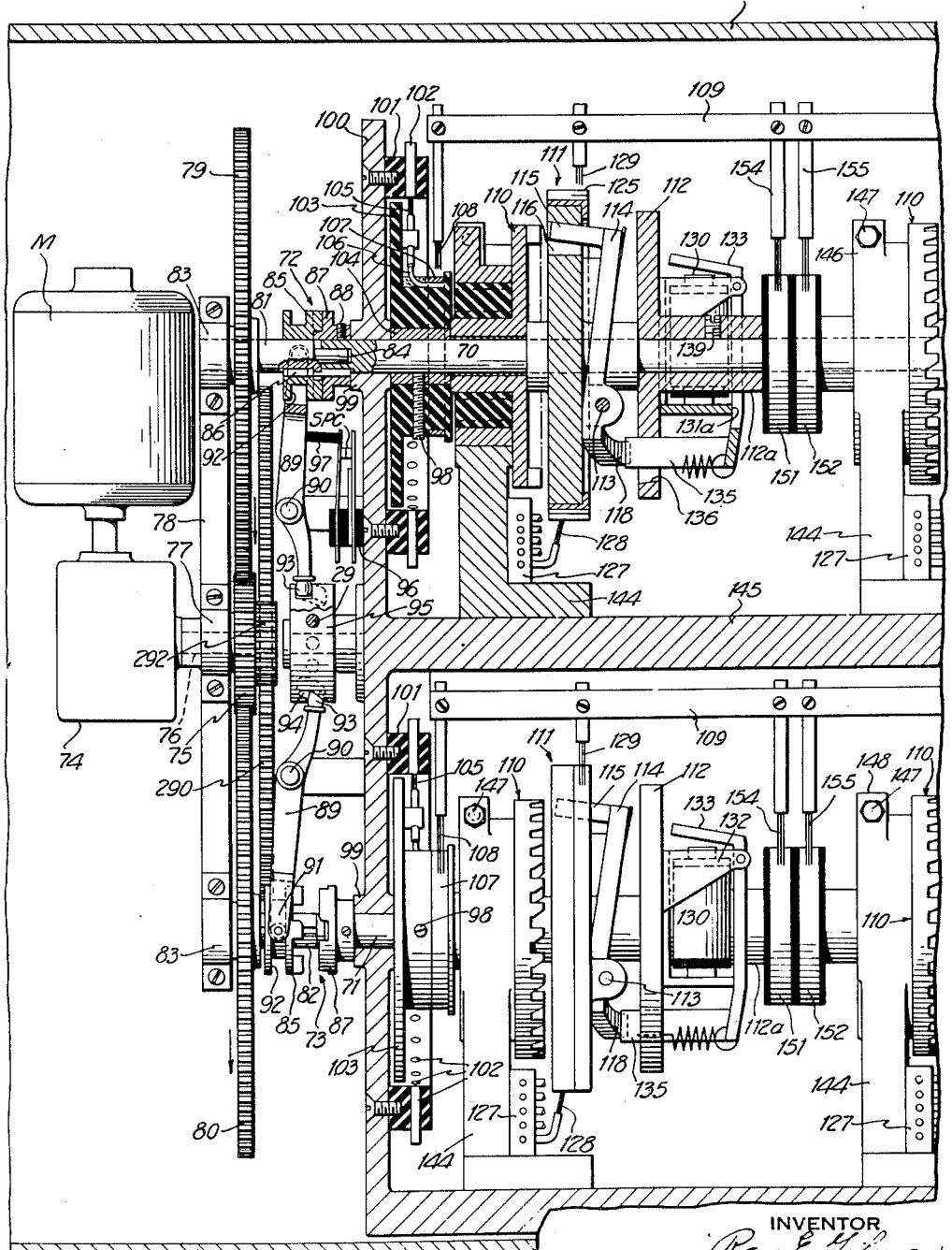

July 4, 1950  R. E. GILMAN  2,513,307
CODING MEANS AND METHOD

Filed May 2, 1946 13 Sheets-Sheet 5

INVENTOR
Ray E. Gilman
BY
ATTORNEY

July 4, 1950  R. E. GILMAN  2,513,307
CODING MEANS AND METHOD
Filed May 2, 1946  13 Sheets-Sheet 6
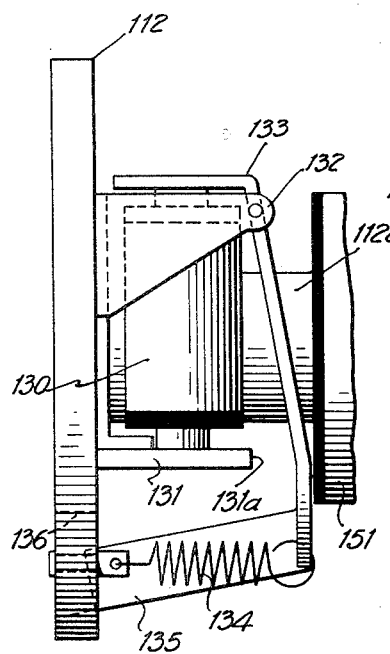
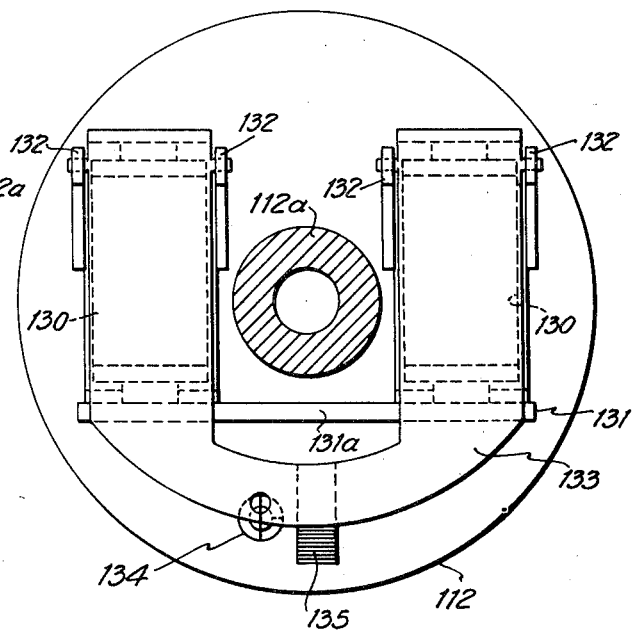
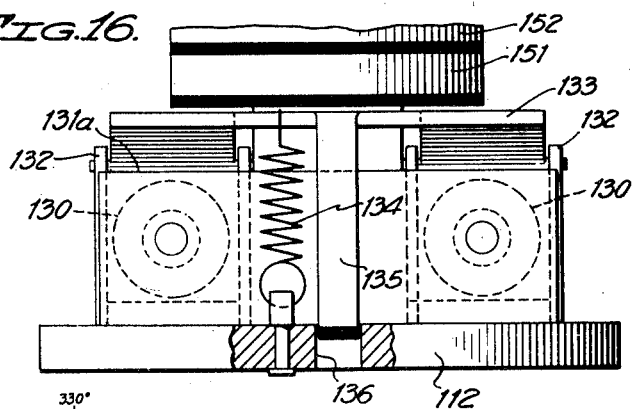
INVENTOR
Ray E. Gilman
BY
ATTORNEY July 4, 1950 R. E. GILMAN 2,513,307
CODING MEANS AND METHOD
Filed May 2, 1946 13 Sheets-Sheet 7
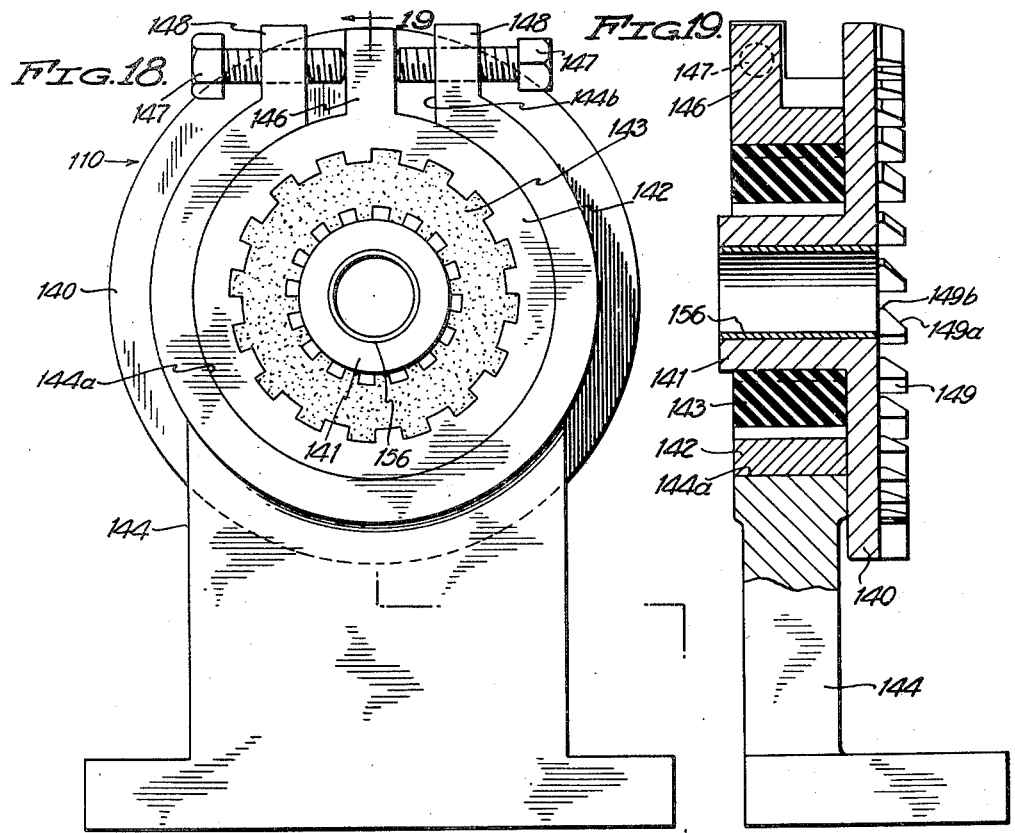
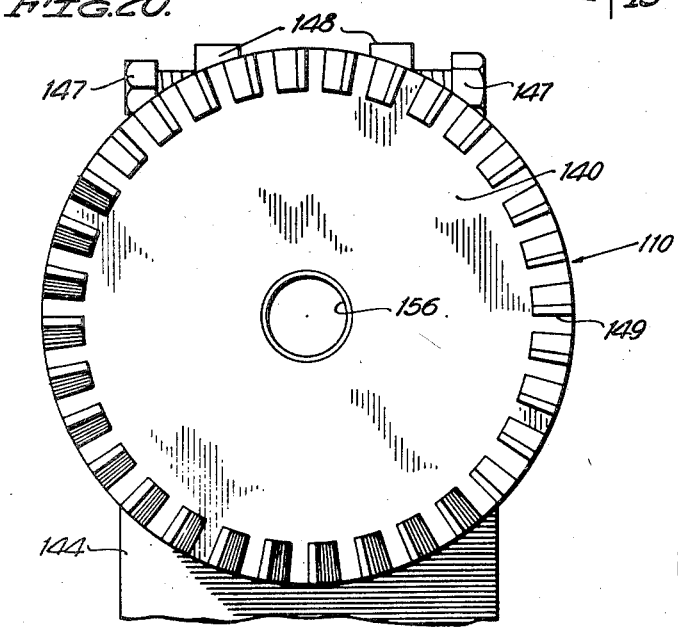
INVENTOR
Ray E. Gilman
BY
ATTORNEY July 4, 1950     R. E. GILMAN     2,513,307
CODING MEANS AND METHOD
Filed May 2, 1946     13 Sheets-Sheet 8
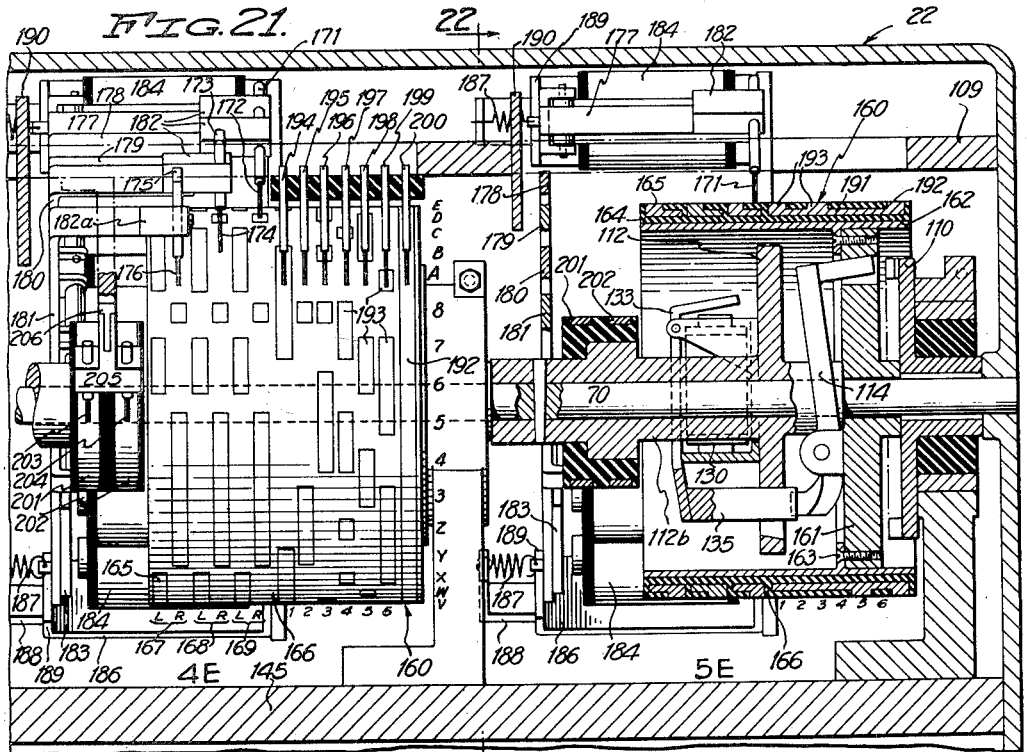
FIG. 21.
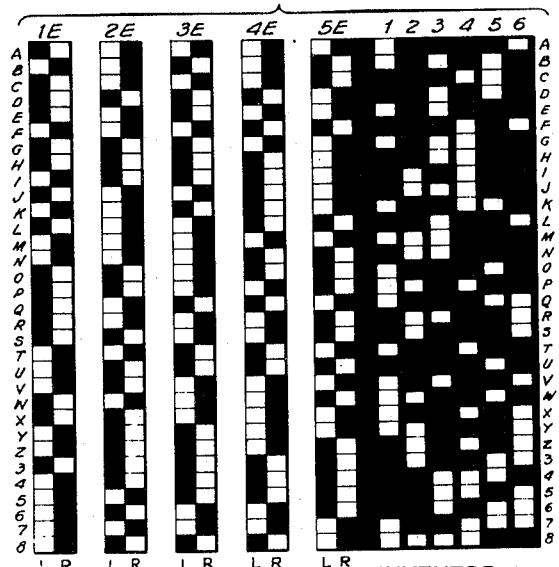
FIG. 23.
FIG. 24.
| | | | | |
|---|---|---|---|---|
| 1 | M 21 | 1 | M 45 |
| 2 | M 26 | 2 | M 40 |
| 3 | M 31 | 3 | M 35 |
| 4 | M 36 | 4 | M 30 |
| 5 | M 41 | 5 | M 25 |
| 6 | M 22 | 6 | M 44 |
| 7 | M 27 | 7 | M 39 |
| 8 | M 32 | 8 | M 34 |
| 9 | M 37 | 9 | M 29 |
| 10 | M 42 | 10 | M 24 |
| 11 | M 23 | 11 | M 43 |
| 12 | M 28 | 12 | M 38 |
| 13 | M 33 | 13 | M 33 |
| 14 | M 38 | 14 | M 28 |
| 15 | M 43 | 15 | M 23 |
| 16 | M 24 | 16 | M 42 |
| 17 | M 29 | 17 | M 37 |
| 18 | M 34 | 18 | M 32 |
| 19 | M 39 | 19 | M 27 |
| 20 | M 44 | 20 | M 22 |
| 21 | M 25 | 21 | M 41 |
| 22 | M 30 | 22 | M 36 |
| 23 | M 35 | 23 | M 31 |
| 24 | M 40 | 24 | M 26 |
| 25 | M 45 | 25 | M 21 |
INVENTOR
Ray E. Gilman
BY
ATTORNEY

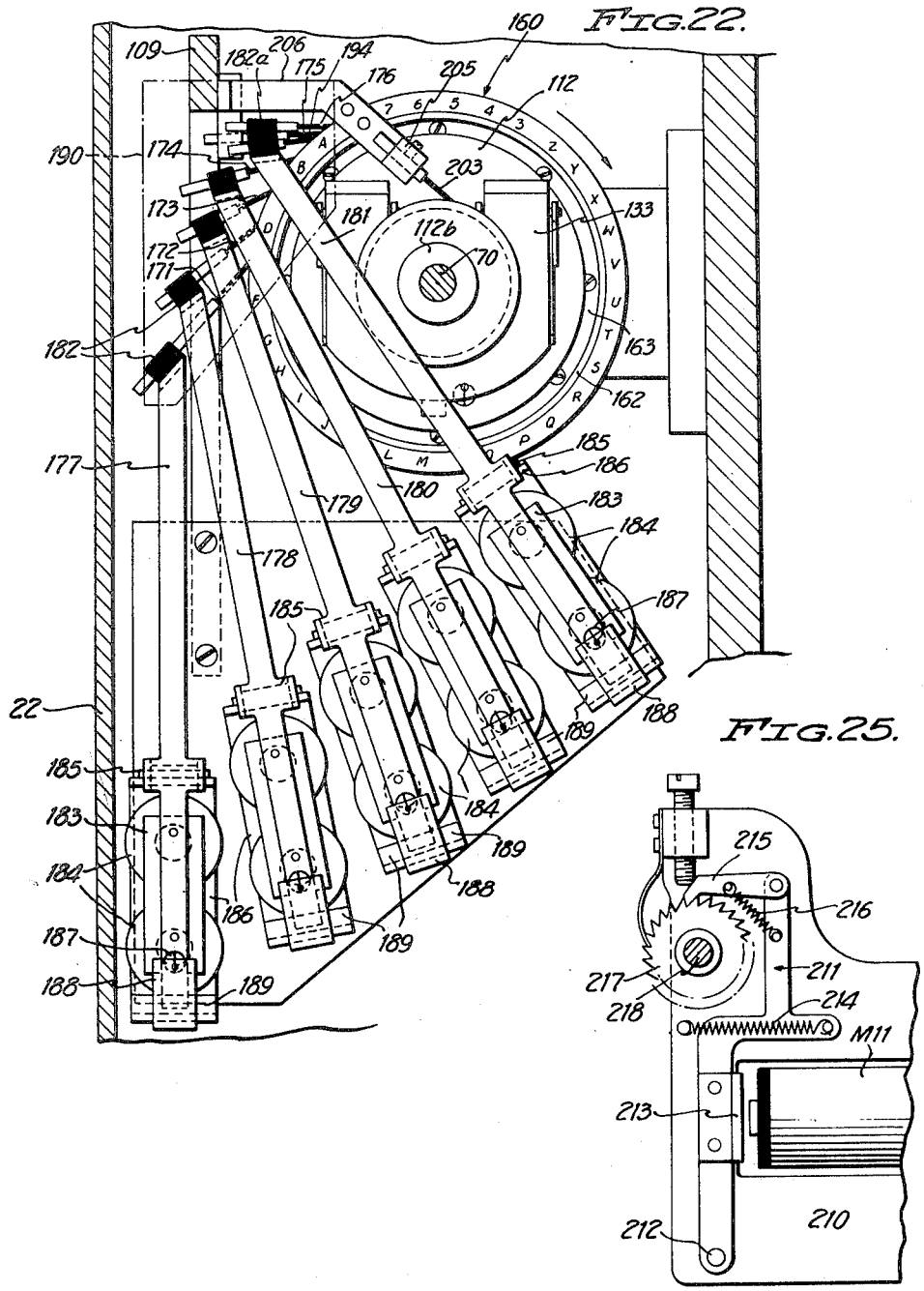

July 4, 1950  R. E. GILMAN  2,513,307
CODING MEANS AND METHOD
Filed May 2, 1946  13 Sheets-Sheet 10
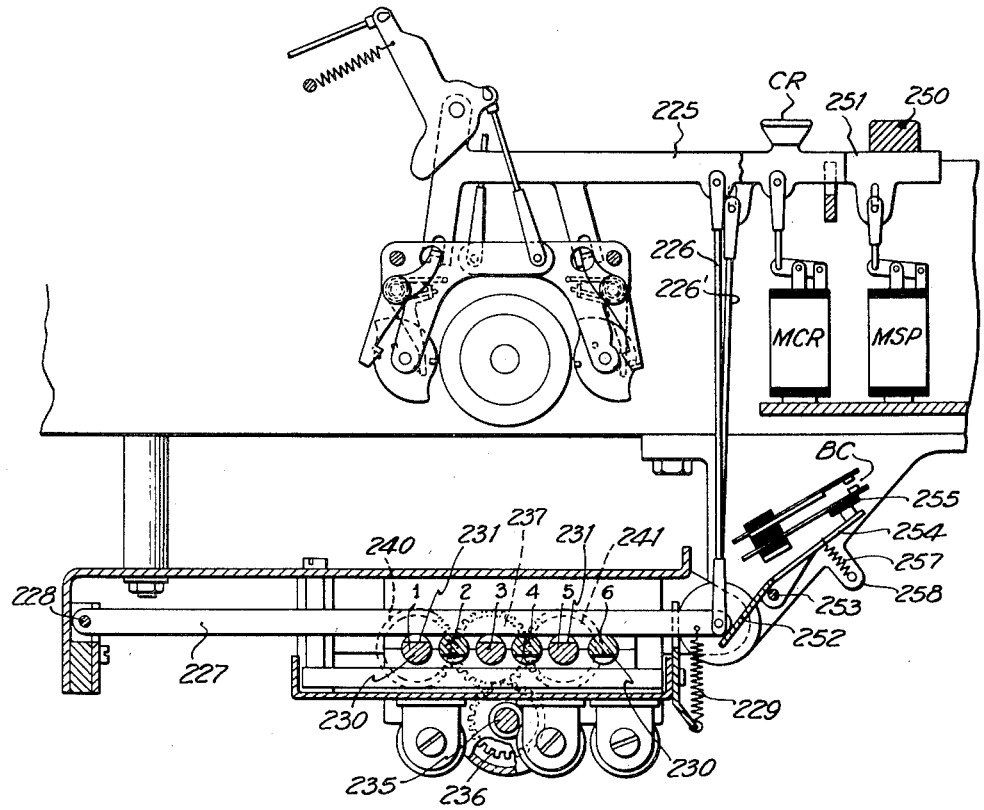
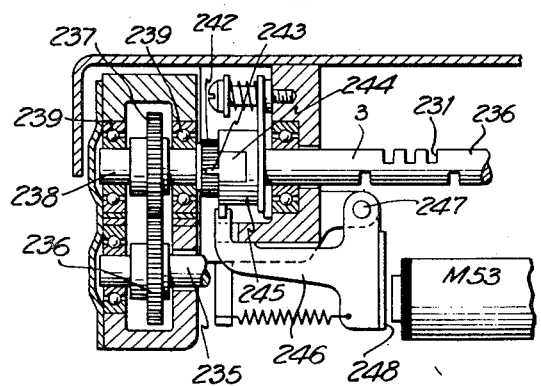
INVENTOR
Ray E. Gilman
BY
ATTORNEY July 4, 1950  R. E. GILMAN  2,513,307
CODING MEANS AND METHOD
Filed May 2, 1946  13 Sheets-Sheet 11
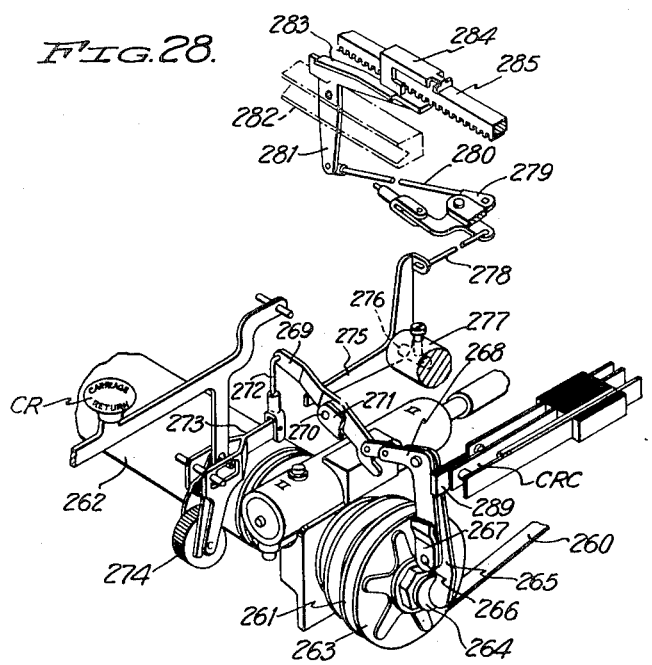
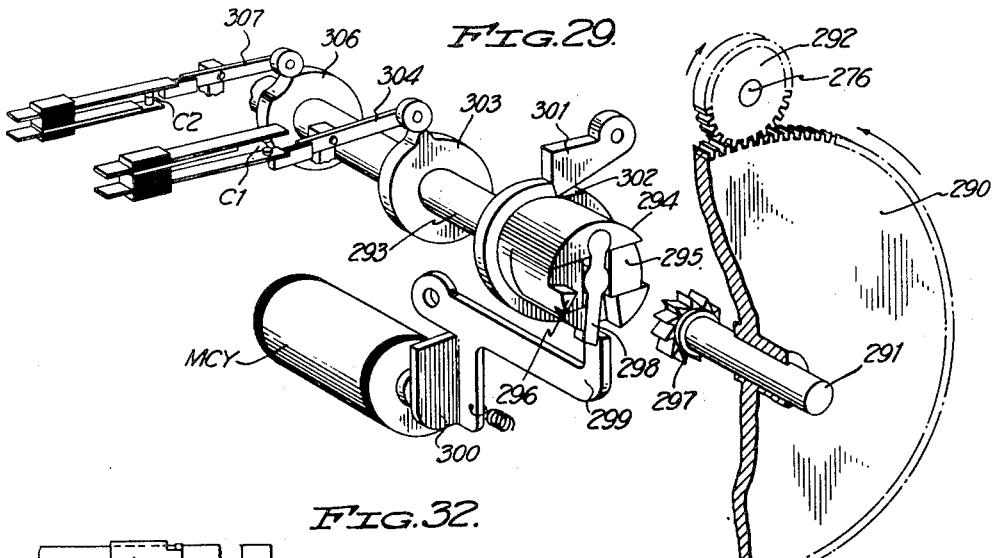
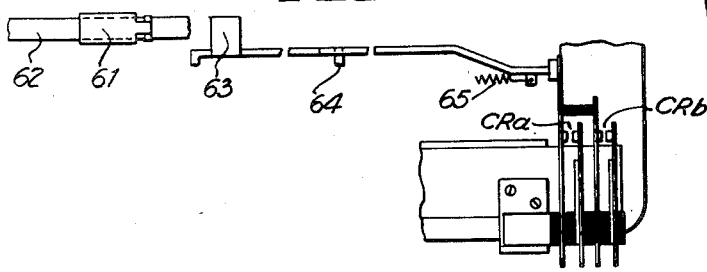
INVENTOR
Ray E. Gilman
BY
W. M. Wilson
ATTORNEY Patented July 4, 1950

2,513,307

UNITED STATES PATENT OFFICE 2,513,307

CODING MEANS AND METHOD

Ray E. Gilman, Providence, R. I., assignor to International Business Machines Corporation, New York, N. Y., a corporation of New York Application May 2, 1946, Serial No. 666,576

20 Claims. (Cl. 35—2)

This invention relates to a method of coding messages and to apparatus for carrying out the method. The word "coding" is used in its strict sense, as distinguished from "ciphering," meaning a method in which code characters are substituted by groups for groups of characters to be coded. Heretofore, coding has involved the use of a code book in which appear groups of code characters each arbitrarily chosen to represent a word, a phrase, or even a sentence.

The method of this invention is similar to coding in the sense that code characters are substituted by groups for groups of characters to be coded, but is different from coding in that it is not dependent upon a code book. According to the principle of the invention, the clear text is divided into groups containing a uniform number of characters and a group of code characters is derived from each group of the clear by a process in which the selection of each code character is dependent upon all of the characters in the related clear group and also upon its position in the group of code characters.

The general aim of the invention is to provide a system of secret communication having a secrecy approximating that of a code, combined with a flexibility comparable with ciphering.

A particular object is to provide an apparatus capable of coding messages, as distinguished from ciphering them. So far as I am aware, machines which have been devised heretofore for secret communication have operated on the ciphering principle, of substituting one character for another, by some kind of scrambling means, which is shifted in accordance with a complex program or "key word." So far as I am aware no machine has ever been devised which operates on the coding principle, of replacing a number of characters as a group by another group of characters, so that the changing of one character of the plain text group will result in a completely different code group.

It is an object of the invention to provide a code system which can be easily changed from time to time, as considered necessary or advisable, making unnecessary the precautions now required for handling code books, to prevent them from falling into enemy hands.

Another object is to provide a coding system based upon code members used as a group, the code members in the group being exchangeable, or interchangeable, to modify the code, the number of code members used at one time being small, but the possible number of different code members from which a selection can be made being very large.

The code member employed is one of the new features of the invention, being of such a nature that it can be composed by a mathematical process, which includes steps enabling a multiplicity of different code members to be derived.

An object of the invention is to provide a coding apparatus which is dependent for its correct operation only on the sending and receiving machines having the same code members and not upon the operator's following a fixed program in order to keep both machines in step.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an elevation of two coding sticks made in accordance with the principle of the invention.

Fig. 2 is a fragmentary view of the left hand coding stick of Fig. 1 turned to a different position, to demonstrate the method of use of the coding sticks.

Fig. 3 is a diagram of the coding of two different words with the coding sticks shown in Fig. 1.

Fig. 4 is a diagram of the coding of a message.

Figures 5, 6, 7:
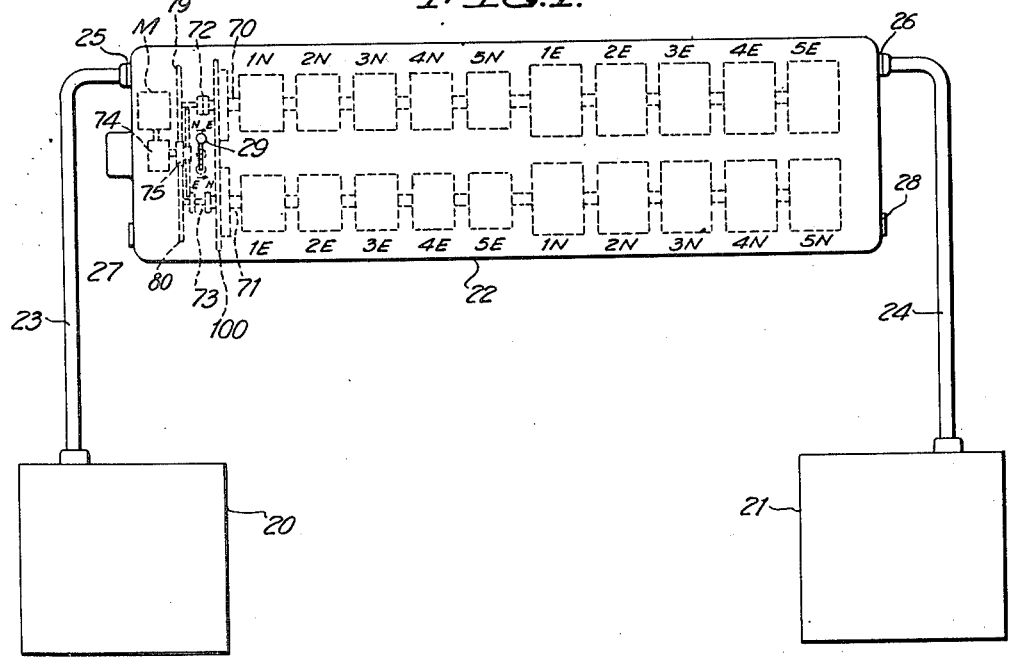
Figs. 5 and 6 are tables showing the derivation of code sequences utilized in the invention.

Fig. 5 also shows a portion of a code member made up from one of the sequences.

Fig. 7 is a block diagram of a coding apparatus made in accordance with the principle of the invention.

Fig. 8 is a partial vertical section of the manually operated typewriting machine represented by the rectangle at the left in Fig. 7.

Fig. 9 is a vertical section of a keyboard locking mechanism of the typewriter shown in Fig. 8.

Fig. 10 is a horizontal sectional view through a portion of the translator, showing the construction of the storage units.

Figure 11:
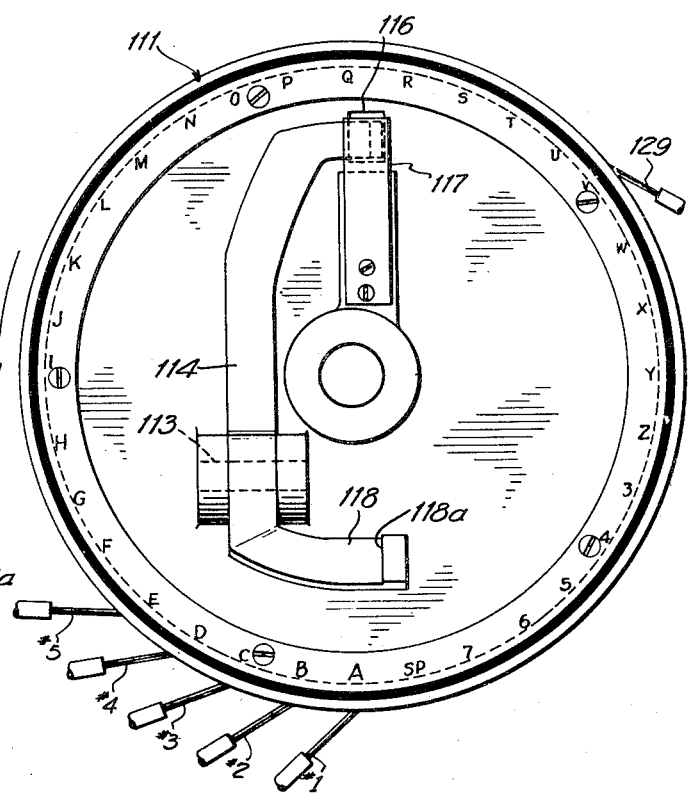

Fig. 11 is a side elevation of one of the code members.

Figure 13:
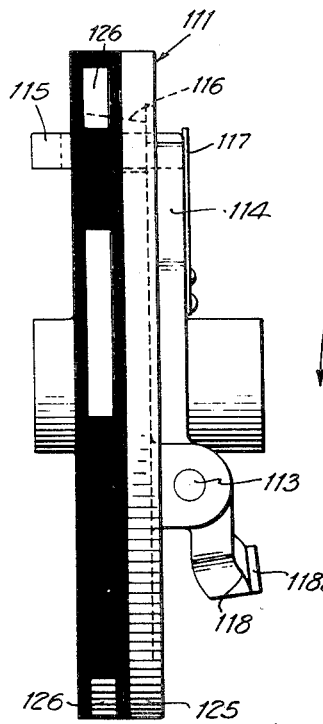
Figure 12:
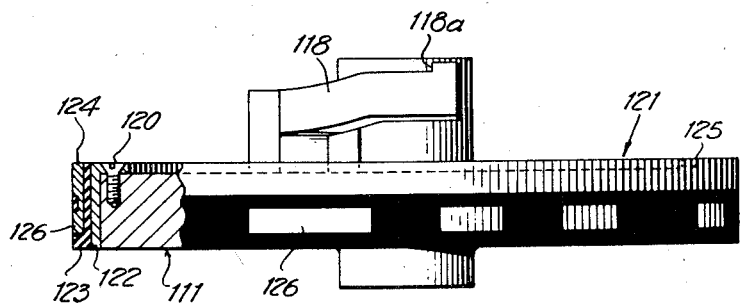

Figs. 12 and 13 are two elevations from different angles taken edgewise of the disk shown in Fig. 11.

Figure 14:

Fig. 14 is a diagram of the sequences of code elements on the code members.

Fig. 15 is a side elevation of one of the driving disks.

Figs. 16 and 17 are elevations of the driving disk shown in Fig. 15, taken edgewise at two different angles.

Fig. 18 is a side elevation of a locking wheel.

Fig. 19 is a vertical axial section of the locking wheel.

Fig. 20 is an elevation of a locking wheel taken at the side opposite Fig. 18.

Fig. 21 is a horizontal section through a portion of the translator showing two of the translating code members.

Fig. 22 is a vertical section substantially on the line 22—22 of Fig. 21.

Fig. 23 is a diagram of the sequences of code elements and typewriter control code of the translating code members.

Fig. 24 is a table of the electrical connections between the storage code member sensing brushes and the magnets controlling the translator code member control brushes, for both the coding and decoding sections of the machine.

Fig. 25 is a side elevation of a stepping mechanism, four of which are employed in the translator.

Fig. 26 is a partial vertical section of the automatically operated typewriter.

Fig. 27 is a fragmentary sectional view of the control mechanism for the permutation bars of the auto typewriter.

Fig. 28 is a simplified perspective view of the carriage return control means of the auto typewriter.

Fig. 29 is a perspective view of a cycling device, two of which are employed in the translator.

Figure 30A:
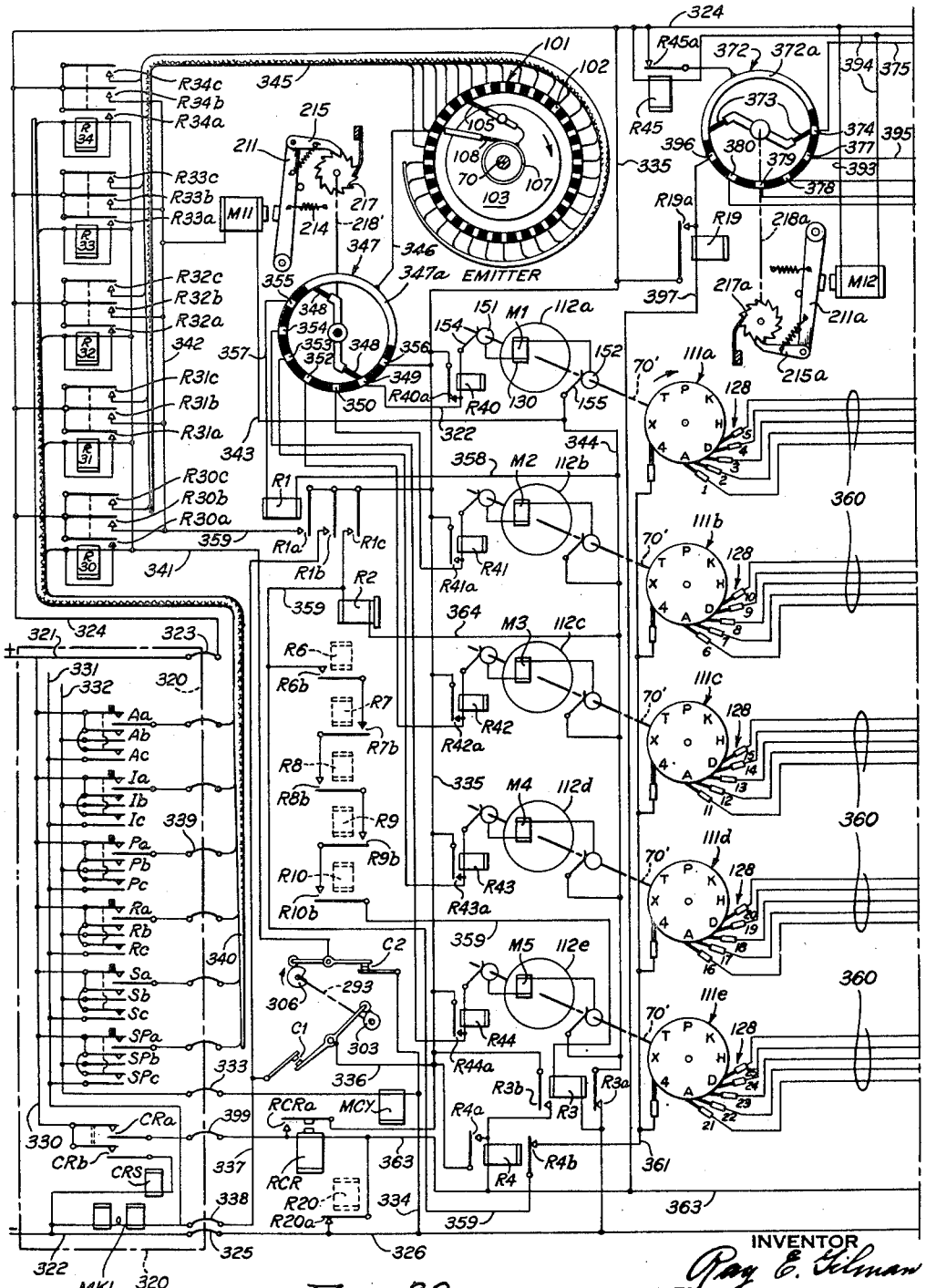
Figure 30B:
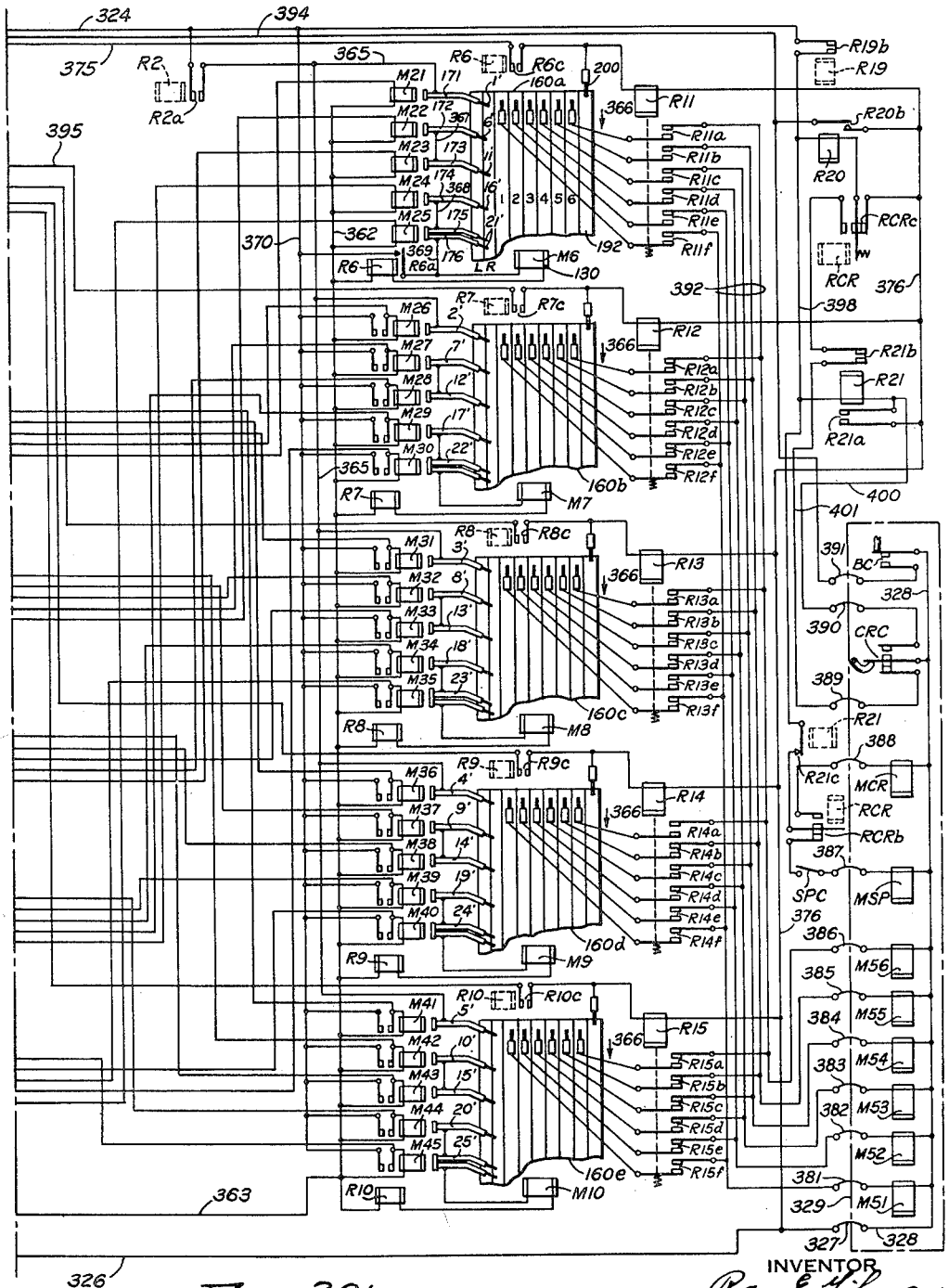

Figs. 30a and 30b are two parts of the complete circuit diagram of the machine.

Fig. 31 (sheet 6) is a timing diagram of the cam contacts of the cycling device.

Fig. 32 is a fragmentary plan view of a portion of the manually controlled typewriter, showing the carriage return control means.

Fig. 33 (sheet 3) is a detail view of the carriage return lever operating means of the manually operated typewriter.

The principle of the invention will first be explained by reference to an elementary form of the coding device, then an automatic apparatus constructed in accordance with the principle of the invention will be described.

Fig. 1 shows two coding sticks, labeled North and East, respectively. Each coding stick is composed of a holder 10 and five strips or code members 11. The five code members of each stick are individually identified by the numbers 1, 2, 3, 4, 5 at the bottom. The holder is made up of a back board 12 and a cover sheet 13, between which lie the code members 11. The cover sheet is slitted near each end of the stick with individual slits for each code member to pass through and in this way the code members are guided for longitudinal movement. Each code member has on its upper half a series of characters and on its lower half a sequence of code elements. In this case there are two kinds of code elements, namely, blanks and crosses. The cover sheet has near its upper end a window 14 for viewing the characters and near its lower end a window 15 for viewing the code elements.

The sequences of code elements are of a peculiar nature, which may be described as a minimal transitive dyadic sequence: transitive, because each increment of movement of a code member to bring the next character into the window 14 exposes a different combination of five code elements in the window 15; minimal, because in thirty-two increments of movement the entire thirty-two possible combinations of two kinds of code elements taken five at a time are successively exposed, without duplication; dyadic, because the sequence is based upon the number 2, that is, it is composed of two kinds of code elements.

There are 2048 possible different sequences of the type shown in Fig. 1, composed of two kinds of code elements to be taken five at a time. There are factorial 32 possible arrangements of the set of characters shown. The possible number of different code members is slightly less than 2048 times factorial 32, due to duplication. The code members used may be all the same, or all different or partly the same and partly different. Fig. 1 shows the code members of the two coding sticks all different, with the exception of strips 1 and 2 of the North coding stick.

In using the coding sticks a group of plain text characters is set up in the window 14 of one of the coding sticks, say the North stick. Fig. 1 shows the code members set to the positions in which five A's appear in the window 14. This sets up in the window 15 a pattern of code elements consisting of five combinations pertaining, respectively, to the five A's in the window 14. This pattern is now read out crosswise into the East stick, which is turned 90°, to the position shown in Fig. 2, and its code members adjusted to make the patterns in the windows 15 of the two code sticks agree. This is done by reading the horizontal rows of code elements in the window 15 of the North stick successively and pulling out each strip of the East stick until the same combination is shown in its window 15 as in the corresponding horizontal row of the window 15 of the North stick. For example, the first horizontal row of code designations of the North stick is blank, blank, cross, blank, cross. The #1 strip of the East stick is pulled to the right until this same combination appears in the window 15. The process is repeated with each of the other strips in succession. When finished, the two patterns agree and the window 14 of the East stick shows the group of characters 8N3QY. The group AAAAA has been coded into the group 8N3QY.

The receiver of the message has a pair of coding sticks identical with those of the sender. On receiving the group 8N3QY, the receiver sets up these characters in the window 14 of his East stick and then adjusts the strips in the North stick, arranged in the same 90° relation as shown in Figs. 1 and 2, to reproduce in the window 15 of the North stick the pattern shown in the window of the East strip. The #1 strip of the North stick is adjusted to bring the combination blank, cross, cross, blank, blank into the window 15, then the other strips are adjusted in the same way, to reproduce the vertical rows of the East stick. The original plain text group will then appear in the window 14, namely, AAAAA.

It will be observed that the code group is derived from the plain text group, not by a ciphering process of substituting one character for another, but by setting up a pattern of code combinations corresponding to the plain text group and reproducing that pattern transversely to set up the code group. The first character of the code group is dependent upon all five characters of the plain text group, and so with each other character of the code group. This is clearly shown by the example in Fig. 3. At the left side the word "Paris" has been coded into the combination L71CR. As shown at the right side, changing one letter has completely changed the code group. The word "Paris" codes into DJ3CC. It happens that C appears in the fourth position in each code group, but this is purely coincidence as shown by the fact that the fourth letter was the one changed in the plain text.

Fig. 4 shows the procedure in coding a message. The words "Paris Tonight Eight" are typed with normal spacing between words and then the message is sub-divided into groups of five characters, treating the spaces as characters. It will be noted that in the North stick the space symbol "SP" appears in the bottom character space. The groups so formed are coded in the manner previously mentioned, the resulting code groups being shown below, separated by spaces to make them distinguishable.

The coding system is not confined to groups of five. The groups may contain more or less characters, or different numbers of characters. For example, it is possible to code groups of three characters into groups of three characters or to code groups of four characters into groups of five characters, or groups of six characters into groups of six characters, etc. In coding groups of four characters into groups of five characters, the North coding stick will have only four code members, but the combinations will be composed of five code elements as in Fig. 1. On the other hand, the East coding stick will have five code members, but their sequences will be for combinations of four, hence will have only sixteen combinations in each sequence, and a like number of characters. The smaller groups reduce the alphabet which can be used and also reduce the complexity, but do not otherwise affect the system. The use of six in a group enormously increases the complexity, as compared with five in a group, and also makes available a larger number of different characters. The sequences are not necessarily dyadic sequences. A triadic sequence increases the complexity but also complicates the operation. The degree of complexity required will determine which of the types of sequences and groupings to use.

*Deriving the sequences*

The dyadic sequences shown in the illustrative example are most easily derived by a mathematical process. By way of example, Fig. 5 shows in horizontal line A the series of numbers 1 1 1 2 2 1 1 1 2 2 1 3 3 1 5 5. This is converted into a minimal, transitive, dyadic sequence, shown in a horizontal line B, in the following manner: Under the first 1 write 1, under the second 1 write 0, under the third 1 write 1, under the first 2 write two 0's, under the second 2 write two 1's, and so on. 1's and 0's are written alternately, but the digit in line A determines how many 1's or how many 0's are to be written in line B.

If groups of five characters are taken from adjacent squares in line B, it will be found that each group is composed of a different combination of characters. The first group is 10100, the second group is 01001, the third is 10011, and so on. The last four groups are made up by taking characters from the beginning of the sequence; thus, group 29 is 00001, group 30 is 00010, group 31 is 00101, and group 32 is 01010. In other words, the sequence is cyclic; if a strip bearing the sequence is curled in a circle, so that character 32 stands to the left of character 1, the thirty-two groups can be brought into reading position by rotating the circle by increments of one character length each and each increment or angular position can represent a different letter of the alphabet or number.

In making up a code member from the sequence in line B, for a coding stick as shown in Fig. 1, a cross will be placed in each position corresponding to a 1 and a blank will be left in each position corresponding to a 0. Such a code member is shown at the bottom of Fig. 5 in horizontal line B'. The code elements in the four squares just to the left of "SP" are a repetition of the four code elements at the left end of the sequence, this being necessary because the strip is not curled into a circle.

From the basic sequence shown in line B, many other sequences can be derived by the process illustrated in lines C—G. Taking first line C, a 1 is written below the first 1 in line B. For the second position of line C, the number in the first position is doubled, hence 2 is written. For the third position the number in the second position is doubled and 1 is added to it, because there is 1 in the third position of line B, hence 5 is written. For the fourth position, 5 is doubled and 10 is written. For the fifth position, 10 is doubled and the result, 20, is reduced, modulo 16, to 4. In the sixth position, 4 is doubled and 1 is added, making 9. In the seventh position, 9 is doubled, the result, 18, is reduced modulo 16, making 2, and 1 is added to this making 3. The same procedure is followed to the end of line C. The result is a series composed of the digits 0, 1 . . . 15, in which each digit occurs twice.

On reading line C, certain pairs will be observed to occur in the same order. The horizontal brackets point out the pairs 10–4, 10–4. These are considered pairs, for the purpose of the derivation to be described, although in the case of the second pair other numbers intervene between the 10 and the 4. Such a pair is distinguished from other pairs which occur in inverse order, for example, the pairs 2–5, 5–2. A pair of the first type, such as 10–4, 10–4, is selected and the position of these pairs in the series, including all digits between them, is switched. The resulting series is shown in line D (disregard for the moment the horizontal brackets under this line).

A new dyadic sequence is derived from line D as shown in line E. The numbers in line D are reduced modulo 2 and 1 or 0 written in the corresponding positions of line E. The brackets under line D point out another pair, 11–8, 11–8, which can be switched, in the manner previously described, to produce a new series from which another sequence can be derived.

Line F shows a new series of numbers derived from line D by switching the bracketed sequences 11–8, 11–8, and below this in line G is a dyadic sequence derived from line F, by reducing the latter sequence modulo 2.

Fig. 6 shows a group of sequences derived from a different origin than the basic series shown in line A of Fig. 5 and entirely different from those which can be derived from line A of Fig. 5. The basic sequence shown in line H of Fig. 6 is derived by a mathematical procedure which will now be explained.

A congruence is written based upon a prime polynomial of degree 5 that belongs to the exponent $2^5-1$, for example $X^5+X^2+1\equiv 0$.

This congruence can be written in the following additional forms:

1. $X^5 \equiv -X^2-1$
2. $X^5 \equiv X^2+1$
3. $X^5+X^2 \equiv 1$

Using these basic congruences, a tabulation is made of congruences of the powers of X, until the terms repeat, as follows:

1. $X^0 \equiv 1$
2. $X \equiv X$
3. $X^2 \equiv X^2$
4. $X^3 \equiv X^3$
5. $X^4 \equiv X^4$
6. $X^5 \equiv X^2 + 1$ (from congruence 2)
7. $X^6 \equiv X^3 + X$
8. $X^7 \equiv X^4 + X^2$
9. $X^8 \equiv X^5 + X^3 \equiv X^3 + X^2 + 1$ (from congruence 2)
10. $X^9 \equiv X^4 + X^3 + X$
11. $X^{10} \equiv X^5 + X^4 + X^2 \equiv X^4 + 1$ (from congruence 3)
12. $X^{11} \equiv X^5 + X \equiv X^2 + X + 1$ (from congruence 2)
13. $X^{12} \equiv X^3 + X^2 + X$
14. $X^{13} \equiv X^4 + X^3 + X^2$
15. $X^{14} \equiv X^5 + X^4 + X^3 \equiv X^4 + X^3 + X^2 + 1$ (from congruence 2)
16. $X^{15} \equiv X^5 + X^4 + X^3 + X \equiv X^4 + X^3 + X^2 + X + 1$ (from congruence 2)
17. $X^{16} \equiv X^5 + X^4 + X^3 + X^2 + X \equiv X^4 + X^3 + X + 1$ (from congruence 3)
18. $X^{17} \equiv X^5 + X^4 + X^2 + X \equiv X^4 + X + 1$ (from congruence 3)
19. $X^{18} \equiv X^5 + X^2 + X \equiv X + 1$ (from congruence 3)
20. $X^{19} \equiv X^2 + X$
21. $X^{20} \equiv X^3 + X^2$
22. $X^{21} \equiv X^4 + X^3$
23. $X^{22} \equiv X^5 + X^4 \equiv X^4 + X^2 + 1$ (from congruence 2)
24. $X^{23} \equiv X^5 + X^3 + X \equiv X^3 + X^2 + X + 1$ (from congruence 2)
25. $X^{24} \equiv X^4 + X^3 + X^2 + X$
26. $X^{25} \equiv X^5 + X^4 + X^3 + X^2 \equiv X^4 + X^3 + 1$ (from congruence 3)
27. $X^{26} \equiv X^5 + X^4 + X \equiv X^4 + X^2 + X + 1$ (from congruence 2)
28. $X^{27} \equiv X^5 + X^3 + X^2 + X \equiv X^3 + X + 1$ (from congruence 3)
29. $X^{28} \equiv X^4 + X^2 + X$
30. $X^{29} \equiv X^5 + X^3 + X^2 \equiv X^3 + 1$ (from congruence 3)
31. $X^{30} \equiv X^4 + X$
32. $X^{31} \equiv X^5 + X^2 \equiv 1$ (from congruence 3)

From this tabulation, it will be observed that $X^{31}$ is congruent to 1 as is $X^0$, that is, the terms begin to repeat at $X^{31}$.

The dyadic sequence in line H is made up by writing 1 wherever the final term is 1 and writing 0 wherever the final term is a power of X, except that an additional 0 is added to the sequence of four 0's called for by the second to fifth lines of the tabulation, making a sequence of five 0's in the corresponding positions of line H. Additional sequences can be derived from line H by the same method illustrated in Fig. 5, several examples being shown in lines I—M. In this case, in deriving the new series of line I from the sequence of line H, the series starts with the digit 5, but the procedure is otherwise the same. Line J is derived from line I by substitution of the sequences between pairs 5–10, 5–10. Line L is derived from line J by substitution of the sequences between pairs 11–19, 11–19.

*Coding machine*

A coding machine constructed in accordance with the principle of the invention is shown in general outline in Fig. 7. It comprises a manually operated typewriter 20, an automatically operated typewriter 21 and a coding unit 22. The typewriters have cables 23 and 24 connected to them, adapted to be plugged into sockets 25 and 26, or 27 and 28 of the coding unit. The sockets 25 and 26 are used when coding and the sockets 27 and 28 when decoding. When coding, a setting lever 29 is thown upward to the position N→E, when decoding said lever is pulled down to the position E→N.

The manually operated typewriter is shown in Fig. 8. It is similar in construction to the one shown in Patent 1,936,466 and will therefore be described only briefly. The typewriter comprises a power driven roller 30 at the front and back of which are arranged two sets of cams 31 and 32. The cams are rotatably mounted upon oppositely arranged bell cranks 33 pivoted upon stationary rods 34. The upper ends of the bell cranks are connected to related type bar operating levers 35 by links 36. The levers 35 are pivoted upon a stationary rod 37 upon which key bars 38 are also pivoted.

The key bars control latch levers 39 having latches 40 engaging lugs 41 on the related cams, to hold them against the action of spring influenced arms 42, which engage pins 43 on the cams and tend to rotate the respective cams, to throw their eccentric peripheries toward the roller 30. The latch levers 39 are pivoted on the bell cranks 33 and have upwardly extending arms 39a with bent-over ends engaging in slots 44 of the downwardly extending arms 45 of their related key bars 38. The upper end of the type bar operating lever 35 is connected by a link 46 to one end of a toggle lever 47 articulated at 48 to the foot of a type bar 49 pivoted on a wire 50. Upon actuation of a key bar, the latch lever 39 releases the cam, which is rocked against the roller by the spring arm 42 and caused to execute one-half revolution, in the course of which it rocks out the bell crank 33 and operates the type bar. Each bell crank 33 has a downward extension on which is journaled a roller 51 for operating three normally open contacts $a$, $b$ and $c$.

An interlock mechanism is provided for the key bars, which permits only one key to be operated at a time. This comprises a series of small disks 55 mounted in a channel 56 which is supported on the comb 57 and slotted to allow the ends of the key bars 38 to extend through it. The small disks almost completely fill the channel from end to end, having just enough freedom of movement to permit one key bar to be depressed. A keyboard locking mechanism is provided as shown in Fig. 9. This includes a locking lever 58 pivoted on the rod 37 and having its outer end turned up and back so as to extend through a related slot of the comb and the interlock channel 56. A keyboard locking magnet MKL mounted below the lever 58 has a plunger 59 connected by a stiff spring 60 to the locking lever. When the magnet is energized, the locking lever is pulled down into the set of small disks and prevents any key from being depressed.

Means are provided to return the carriage of the manually operated typewriter automatically at the end of a line. A line will always consist of a number of characters equal to a multiple of five, since spaces count as characters in the groups of five. For example, the lines may have a uniform length of 65 characters, or 13 groups of five.

Among the key levers 38 of the manually operated typewriter is a lever 38a (Fig. 33) which controls a carriage return mechanism. This lever is not affected by the keyboard locking mechanism. The carriage return mechanism of the manually operated typewriter is not shown in the drawing, but it is similar to the carriage return mechanism of the auto-typewriter, which will be described later. The lever 38a is connected by a linkage 66 to the plunger 67 of a carriage return solenoid CRS.

The illustrative machine has a margin stop mechanism similar to one disclosed in Patents 1,935,456 and 2,157,053. An adjustable margin stop 61 (Fig. 32) on a bar 62 of the carriage cooperates with a stationary margin stop 63 mounted on a pivot 64. The stop 63 has limited freedom of longitudinal movement on its pivot 64 and is normally held at the left limit of its movement (Fig. 32) by a spring 65. When the adjustable margin stop 61 strikes the stop 63, as the carriage reaches the right hand margin, the stop 63 moves to the right. Normally open contacts CRa and CRb are mounted so as to be closed by this movement of the stop 63. As will be explained later, the closure of contact CRb causes solenoid CRS to be energized and starts a carriage return operation.

Coding unit

The coding unit 22 contains two banks of storage units and readout units, as represented by the dotted rectangles in Fig. 7. One bank comprises the storage units 1N–5N and the readout units 1E–5E, the other bank comprises the storage units 1E–5E and the readout units 1N–5N. The two banks of storage units and readout units are mounted on respective shafts 70 and 71, which can be alternatively driven by a motor M through respective clutches 72 and 73 controlled by the setting lever 29. The motor is connected through a gear reduction 74 to a gear 75 (Fig. 10) fixed upon a shaft 76 journaled in a bearing 77 on a bed 78. The gear 75 meshes with two gears 79 and 80 fixed to respective shafts 81 and 82, the gears being driven in the same direction, as indicated by the arrows.

The shafts 81 and 82 are journaled at one end in bearings 83 and each has a reduced portion 84 (see shaft 81) journaled in a socket in the related shaft 70 or 71. A clutch disk 85 is slidably mounted on each shaft 81, 82 and is keyed thereto by a key 86. The clutch disk 85 has teeth adapted to engage in teeth on a flange 87 keyed to the shaft 70 or 71 and fixed thereto by a screw 88. An operating lever 89 for each clutch disk 85 is pivoted at 90 and has a forked end 91 engaging in the slot 92 of the clutch disk 85, and at its opposite end a roller 93 engages in a cam slot 94 on the hub 95 of the setting lever 29. The setting lever has a neutral position and two end positions for engaging the respective clutches 72 and 73. In Fig. 10 the setting lever is thrown forward and the clutch 72 is engaged. A contact SPC mounted by an insulating block 96 on wall 100 is operated through an insulating piece 97 bearing against lever 89. When clutch 72 is engaged contact SPC is closed, at other times it is open.

The left end of each shaft 70, 71 is journaled in a bearing 99 in the vertical partition 100. Secured to the right side of this partition around each shaft is a ring 101 of insulating material provided with thirty-two contact pins 102 distributed circumferentially thereof at uniform spacing. Within the ring 101 is an emitter disk 103 composed of insulating material having a metal bushing 104. The emitter disk is fixed to the shaft by a screw 98. To the face of this disk is attached a single brush 105 connected by a wire 106 to a slip ring 107 on the hub of the disk 103. The brush 105 passes over the contacts 102 of the emitter ring. A brush 108 mounted on a support 109 bears upon the slip ring 107.

*Storage units.*—Each storage unit comprises a locking wheel 110, a code member 111 and a driving disk 112. The code member is freely journaled upon the shaft 70 or 71 and has pivoted thereto at 113 a locking dog 114 (Figs. 11–13). The locking dog has a bent-over end forming a tongue 115 which extends through a hole 116 in the disk and is normally held against the disk of the code member by a spring 117, in which position the tongue projects from the left side of the disk, into engagement with the locking wheel 110. The dog has a sloping tail piece 118, the purpose of which will be described presently.

Removably attached to the periphery of the disk of code member 111 by screws 120 is a commutator 121. The commutator comprises an inner metallic ring 122 upon which is moulded a contact ring comprising insulation 123 and metal 124. The metal 124 is completely insulated from the storage disk by the insulation 123. As seen in Fig. 13, the metal forms a continuous contact ring 125 and a plurality of contact spots 126. The contact spots and the intervening insulation on the periphery of the code member constitute two different kinds of code elements, the contact spots corresponding to crosses and the insulation to blanks. The contact spots of each code member have a length and position determined by a particular minimal, transitive, dyadic sequence. Fig. 13 shows in side elevation a storage disk having spots representing the sequence corresponding to strip 1 of the North coding stick in Fig. 1. Fig. 14 is a diagram of contact spots of the five storage disks on shaft 10, representing the sequences shown on the strips 1, 2, 3, 4 and 5, respectively, of the North coding stick in Fig. 1. To understand the arrangement of the contact spots on the commutator, the sequence strip 1 in Fig. 14 can be thought of as applied to the disk in Fig. 11, so that the top code position is directly under "A" and the strip is wound clockwise around the disk, so that the last code position lies on the same radius with SP.

Mounted adjacent the code member 111 on a support 127 are five brushes 128. In Fig. 11 these brushes are identified as #1, #2, #3, #4, and #5, respectively. They make contact with the surface of the code member wherein the contact spots 126 are exposed and are spaced from each other at a distance of one code position. When the code member is in position A, the brushes rest on the first five code positions, as indicated by the small circles in Fig. 14. When the disk turns in the direction of the arrow (Fig. 11) by one increment of the length of one code element, it will be in position B and the brushes will bear upon the second to sixth code positions, respectively. For each angular movement of the storage disk of the length of one code element the brushes will sense a different combination of insulating spots and metal spots, as indicated in Fig. 14. A common brush 129 (Fig. 10) mounted on the support 109 bears upon the continuous metal surface 125.

The driving disk 112 has a hub 112a which is fixed to the shaft by a set screw 139. A two coil magnet 130 (Figs. 15, 16, 17) is fixed to the disk 112 by a bracket 131 on ears 132 of which is pivotally mounted a U-shaped armature 133. In Fig. 17 the armature is shown in the position it assumes when the magnet is energized. When the magnet is deenergized, a spring 134 holds the armature against the edge 131a of the bracket 131. In this position of the armature its tongue 135 extends through a hole 136 in the driving disk, into engagement with the tail piece 118 of the locking dog on the code member 111. When the magnet is in energized condition, the tongue 135 is pulled back into the driving disk, clear of the tail piece 118 of the locking dog 114, so that the latter is released and its tongue 115 engages the related locking wheel 110. When the magnet is deenergized, the tongue 115 engages the tail piece of the locking dog, sliding up on the inclined surface of the tail piece, rocking the dog out of engagement with the locking wheel, and finally engaging the raised end 118a of the locking dog, whereupon the code member is carried along by the driving disk.

The construction of the locking wheel is shown in detail in Figs. 18, 19 and 20. It comprises a flange 140 and a hub 141. The hub is surrounded by a ring 142 and between the ring and the hub is a rubber sleeve 143. The mutually engaging surfaces of the sleeve, the hub, and the ring are fluted, so that the ring and the hub are resiliently held in a definite relative position. The ring 142 is held in a round aperture 144a of a support 144 mounted on a vertical wall 145 (Fig. 10). The aperture 144a opens radially at 144b to provide space for a radial tongue 146 on the ring 142. Set screws 147 threaded into lugs 148 of the support engage opposite sides of the tongue 146, to provide for angular adjustment of the locking wheel. The flange 140 has a circle of thirty-two teeth 149 corresponding respectively, to the thirty-two character positions of the code member. The teeth have sloping shoulders 149a, to allow the tongue 115 of the locking dog to glide into engagement, and rebound shoulders 149b to prevent rebound of the code member. The locking wheel has a central hole containing a bushing 156 providing a bearing for the shaft 70 or 71.

The hub 112a of the driving disk 112 has fixed to it two slip rings 151, 152 with which cooperate brushes 154, 155, respectively, mounted on the support 109.

*Readout units.*—There are five readout units on each shaft, as shown in Fig. 7. The construction of these units is shown in detail in Figs. 21 and 22, which disclose the readout units 4E and 5E on the shaft 70. Each unit comprises a code member 160 having a metal cylinder 162 with a radial flange 163 secured by screws to a disk 161 revolubly mounted on shaft 70. At the right side of the disk 161 is a locking wheel 110 similar in all respects to the locking wheels pertaining to the storage code members. At the left of the disk 161 is a driving disk 112 identical to the driving disks of the storage code members. The driving disk 112 carries a magnet 130 which, when deenergized, causes the readout code member to rotate with the driving disk, and when energized causes the cylinder to be locked in a definite position by engagement of its locking dog 114 with a tooth of the locking wheel 110.

The metal cylinder 162 has a cylinder 164 of insulating material with metal inserts 165 moulded upon it. The cylinder 164 is divided by a medial ring 166 of insulation into left and right halves. The left half is further sub-divided into three sections 167, 168 and 169, each section comprising two zones R and L. There is a separate insulated ring-shaped metal insert in each of said three sections, which is partly covered by insulation but has portions extending to the surface of the cylinder. The surface of the cylinder is divided, peripherally, into thirty-two code positions. In each code positions the metal insert 165 goes through to the surface either in zone R or zone L, to form contact spots. The three sections are identical as to the pattern of the contact spots. The contact spots constitute code element designations, a spot in zone L corresponding to a+ in Fig. 1, while a spot in zone R corresponds to a blank. The pattern of the contact spots on each code member is a minimal, transitive sequence. The five readout code members 1E–5E have contact spot patterns corresponding to the sequences shown on the five strips of the East coding stick of Fig. 1. Wherever the strip has a cross, the code member has a contact spot 165 in zone L; where the coding strip has a blank, the code member has a contact spot in zone R. A diagram of the five different patterns is shown in Fig. 23.

As seen in Fig. 21, the sequence begins at the code position "A" and extends upward around the translating cylinder, the last code element appearing in the code position "8." As seen in Fig. 22, the sequence extends counter-clockwise around the translating drum.

There are six brushes 171, 172, 173, 174, 175, 176 arranged for contact with the left half of the translating cylinder, the brushes being grouped in pairs, the pair 171, 172 making contact with the section 169, the pair 173, 174 making contact with the section 168, and the pair 175, 176 making contact with the section 167. Each of the brushes 171, 172, 173, 174 is mounted on an individual lever 177, 178, 179, 180, while the two brushes 175, 176 are mounted on the same lever 181. The brushes 171—176 are attached to insulating strips 182, 182a secured to the ends of the levers. Each lever has fixed to it an armature 183 associated with a related magnet 184. The levers are mounted by hinges 185 on the metal frames 186 of the magnets. A spring 187 (Fig. 21) attached to each lever and anchored to a bracket 188 on the magnet frame 186, normally holds the lever at one limit position, in which its lower end abuts against a flange 189 of the magnet frame. When the magnet is energized, the lever rocks to its other position in which the upper end abuts against a stop 190 on the support 109.

In the first mentioned position, with the magnet deenergized, the brush attached to each lever rests upon zone R of its related section of the translating cylinder. When the magnet is energized, the brush moves to zone L. According to the selective combinational energization of the magnets, the brushes will be so positioned that each will make contact with a contact spot of the code member when the latter is in a particular angular position, corresponding to the combination of magnets energized. The thirty-two possible combinational energizations of the magnets correspond to the thirty-two different character positions of the readout code member. This will be explained further in connection with the wiring diagram.

The right half of the cylinder 164 has a single ring-shaped metal insert 191 which comes to the surface of the cylinder in a continuous ring 192 and in various spots 193. The surface of the cylinder, between the rings 192 and 166, is subdivided axially into sections constituting code positions 1, 2, 3, 4, 5, 6, and peripherally into 32 character positions A, B, C, . . . 6, 7, 8. The pattern of the spots is determined in accordance with a six-unit code which is suited to the printer to be described presently, and is shown at the right side of the diagram in Fig. 23. Seven brushes 194, 195, 196, 197, 198, 199, 200 rest upon the seven different sections of the right half of the translating cylinder, in axial alignment, being mounted on the support 109. In any one position of the cylinder, circuit paths are provided from the common brush 200, through the common ring 192 and out through any contact spots 193 appearing in that character position, to the individual brushes 194—199.

The hub 112b of the driving disk 112 has mounted on it two slip rings 201 and 202, with which coact brushes 203 and 204 mounted in a block of insulation 205 on a bracket 206 attached to support 109.

Fig. 25 shows a stepping mechanism, the function of which will appear later in the description of the wiring diagram. A magnet M11 is mounted in a frame 210, to which a driving lever 211 is pivoted at 212. The lever 211 has an armature 213 to be attracted by the magnet and is normally held away by a spring 214. The top end of the lever 211 has pivoted to it a stepping dog 215 held by a spring 216 against a ratchet wheel 217 fixed on a shaft 218. The stepping dog is retracted when the magnet M11 is energized and feeds the ratchet wheel when the magnet is de-energized. Four of these stepping mechanisms are used. They are located in the casing of the coding unit 22 (Fig. 7), together with various relays to be referred to later.

Automatic typewriter

The automatic typewriter 21 (Fig. 7) is similar to the manually operated typewriter 20, as far as the power driven type bar operating mechanism is concerned, but includes a permutation mechanism for selective operation of the key levers 225 (Fig. 26).

Each key lever is connected by a link 226 to a related control lever 227 pivoted on a common rod 228 and urged downward by a spring 229 against a set of six revoluble permutation bars 230, bearing the individual numbers 1, 2, 3, 4, 5, 6. In line with the control lever 227 shown in Fig. 26 the permutation bars 230 have slots 231, the slots on the bars 1, 3 and 5 being on the top side, while those on the bars 2, 4 and 6 are on the bottom side. If the bars 2, 4 and 6 are revolved while the bars 1, 3 and 5 remain stationary, all the bars will present slots to the particular control lever 227 shown in Fig. 26, which will therefore rock downward under the influence of the spring 229, actuating the related key lever 225. The arrangement of the slots 231 aligned with each of the control levers 227 is different, so that by rotating different combinations of the permutation bars 230 different keys will be actuated.

The driving and control means for the selective rotation of the permutation bars has substantially the same construction as disclosed in Patent 2,165,247. Under the permutation bars is a drive shaft 235 driven by a motor (not shown). The shaft 235 has a driving gear 236 fixed to its left end (Fig. 27) and a similar gear at its right end, which does not show in the drawing. The gear 236 meshes with a gear 237 fixed to a short shaft 238 journaled in bearings 239, so as to be concentric to permutation bar 3. The gear 237 meshes with gears 240 and 241 fixed to short shafts (not shown) similar to the shaft 238, but concentric to the permutation bars 1 and 5, respectively. At the opposite end of shaft 235 the arrangement is similar, but the gear corresponding to gear 237 is fixed on a short shaft concentric to permutation bar 4, while the gears corresponding to gears 240 and 241 are fixed to short shafts concentric to permutation bars 2 and 6.

The short shaft 238 has fixed to its inner end a ratchet toothed drive wheel 242 positioned to be engaged by a tooth 243 on a sliding dog 244 of a clutch 245 mounted on the end of the related permutation bar 3. As more fully disclosed in Patent 2,165,247, the engagement of the tooth 243 is controlled by a bell crank lever 246 pivoted at 247 and having an armature 248 attached thereto operated by a code magnet M53. (The clutch 245 has the same construction as the one shown in Fig. 29, pertaining to the cycling device.) Each of the other short shafts similar to 238 has the same kind of clutch means for connecting it to the related permutation bar. There are five additional code magnets, to be referred to later as M51, M52, M54, M55 and M56, controlling the respective clutches.

The typewriter includes a space bar 250 on a key lever 251, which can be operated directly by a spacing magnet MSP, or through the permutation unit, by a link 226' connected to one of the operating levers 227, which responds to the space code 4. The magnet MSP is used for automatic grouping in coding. In decoding, spaces are produced through the permutation unit. Another magnet MCR operates the carriage return key CR.

Across the right ends of the operating levers 227 extends a bail 252 pivoted on a stationary rod 253. At one end the bail has fixed to it an arm 254, the end of which bears upon a piece of insulation 255 at the tip of the lower spring of a normally open contact BC. The bail 252 is held by a spring 257, hooked to the arm 254 and to a fixed part 258, against the ends of the operating levers 227. The bail slants downward, in position to be rocked by any operating lever which operates a key lever, to close the contact BC.

The carriage return mechanism is similar to those disclosed in Patents 2,168,442 and 2,104,559 and Fig. 28 is a simplified view of it. A tape 260 is wound around a revoluble drum 261 and its inner end is secured thereto. The tape is connected at its other end to the carriage (not shown), so that when the drum is rotated in clockwise direction the carriage is returned. The drum is revolubly mounted on a shaft which rotates constantly with the power roller 262 and can be clutched thereto by a clutch disk 263. The clutch disk has a hub cap 264 upon which bears one end of a lever 265 pivoted at 266 to a fixed part 267. A leftwardly extending arm 268 of the lever 265 is articulated to a lever 269 pivoted at 270 on a fixed part 271, forming a toggle joint therewith. The lever 269 is connected by a link 272 to a bell crank lever 273 forming part of a power cam mechanism similar to the one shown in Fig. 8, except that its cam 274 is single lobed. This cam mechanism is controlled by the carriage return key CR. When the latter is operated, the clutch 263 is engaged and the tape 260 is wound up, returning the carriage.

Extending under one arm of the lever 269 is a bell crank 275 pivoted at 276 on a fixed part 277. The bell crank 275 is connected by a linkage 278, 279, 280 to a lever 281 pivoted on the rear carriage rail 282. The lever 281 has an arm 283 positioned to be engaged by the left hand marginal stop 284 adjustably mounted on the marginal stop bar 285. When the marginal stop strikes the arm 283, the bell crank 275 rocks the lever 269 far enough to break the toggle and release the clutch.

Mounted in a fixed position near the lever 265 is a transfer contact CRC. A piece of insulation 289 on the middle spring is in position to be moved by the lever 265 when the clutch is engaged, to transfer the contacts. The contacts remain transferred until the clutch is released.

Fig. 29 shows a cycling device, which serves the purpose of locking the keyboard during the setting of the storage code members of the coding unit, to insure that sufficient time is provided to allow each code member to be set before the next key is operated. A gear 290 fixed to a shaft 291 meshes with a gear 292 on shaft 76 (Fig. 10). Coaxial with the shaft 291 is a shaft 293 bearing a clutch head 294. Slidably guided in a transverse slot of the clutch head is a dog 295 having a tooth 296 adapted to engage a ratchet wheel 297 fixed on shaft 291. The dog is urged to the right by an internal spring (not shown), toward position to engage the tooth 296 with the ratchet wheel 297, but is normally held to the left by a lever 298 engaged by a bell crank lever 299 attached to the armature 300 of a magnet MCY. When the magnet is briefly energized, the clutch will be engaged and the shaft 293 will execute one revolution, at the end of which the lever 299, having been released by the deenergized magnet, will retract the dog 295 and stop the shaft 293. A pawl 301 will then drop into a notch 302 on a collar of the clutch head and prevent reverse movement of the shaft 293. The shaft 293 has fixed to it a cam 303 operating a contact lever 304. The contact C1 is open when the shaft 293 is latched and is closed during the rotation of the shaft. The duration of closure of the contact C1 is somewhat longer than one revolution of the shafts 70 or 71. Its timing in relation to the cycle of shaft 293 is shown in Fig. 31.

The shaft 293 also has fixed to it a cam 306 operating a contact lever 307. The contact C2 is closed when the shaft 293 is latched, but opens momentarily shortly before the end of each revolution of the shaft (see Fig. 31). This contact also remains closed somewhat longer than one revolution of the shafts 70 or 71.

*Operation*

The operation of the apparatus will now be explained by showing how the coding of the message depicted in Fig. 4 is carried out. Reference will be made principally to the circuit diagram, Figs. 30a and 30b. At the left side of Fig. 30a is a rectangle 320 of dot and dash lines, representing the manually operated typewriter. Direct current is supplied to positive wire 321 and negative wire 322 of this typewriter from a D. C. source. The wire 321 is connected by plug wire 323 to positive wire 324 in the coding unit 22, while the negative wire 322 is connected by plug wire 325 to the negative wire 326 in the coding unit. The latter wire is connected by plug wire 327 (Fig. 30b) to a negative wire 328 in the autotypewriter, represented by dot and dash lines 329. All of the parts outside of the rectangles 320 and 329 are in the coding unit. The plug wires in the vertical row including 323 and 325 constitute the cable 23 of Fig. 7, while those including 327 constitute the cable 24.

The normal condition of the parts is represented in the circuit diagram. The shaft 70 (represented by dot and dash lines 70' in Fig. 30a) is rotating, the clutch 72 (Figs. 7 and 10) having been engaged by throwing the lever 29 to the position N→E. Consequently, emitter disk 103, driving disks 112, storage code members 111, and readout code members 160 are rotating, the magnets 130 being deenergized. In Fig. 30a the five storage code members are individually identified as 111a–111e, respectively, progressing from left to right on shaft 70, the corresponding driving disks are identified as 112a–112e, while the magnets 130 pertaining to them bear the reference numbers M1–M5, respectively. Similarly, the readout code members are numbered 160a–160e, in Fig. 30b, and their magnets 130 are numbered M6–M10.

The operator strikes, in succession, the keys P A R I S of the manually operated typewriter 20. The striking of the P key causes the related cam 31 to be revolved by a power roller 30, to print a P on the sheet in the typewriter 20. At the same time the contacts Pa, Pb and Pc are closed, the latter completing a circuit from positive wire 321 through wire 330, said contact Pc, wire 331, magnet MKL, to the negative wire 322, energizing said magnet. The lever 58 (Fig. 9) is pulled against the interlock disks 55 and slips between two of them as soon as the key is released, locking the keyboard. A circuit also extends from wire 330, through contact Pb, wire 332, plug wire 333, magnet MCY and wire 334 to the negative wire 326, energizing said magnet. The clutch dog 295 engages and the cycling cams begin to revolve. At 5° contact C1 closes, completing a holding circuit for magnet MKL from wire 324, through wires 335 and 336, contact C1, wire 337, and plug wire 338. This circuit continues to hold the magnet MKL energized after the contact Pc opens.

When contact Pa closes, a circuit is completed from wire 330 through said contact, plug wire 339, cable 340, relay R30 pertaining to the P key, wire 341, normally closed contact C2, and wire 334, to negative wire 326, energizing said relay. Contact R30a closes, completing a holding circuit for relay R30 from wire 324. Contact R30b closes, completing a circuit through said contact, wire 342, magnet M11, wires 343 and 344, normally closed contact R3a to negative wire 326, energizing said magnet. The magnet M11 pertains to one of the stepping devices previously described. When it is energized it retracts the driving lever 211 and the dog 215 ratchets over one tooth of the ratchet wheel 217.

When contact R30c closes a circuit is prepared through cable 345 to the P contact 102 of the emitter 101. When brush 105 engages the P contact, the circuit is extended through said brush, slip ring 107, brush 108, wire 346, the large segment 347a of a distributor ring 347, brushes 348, contact 349, relay R40, brush 154, slip ring 151, magnet M1, slip ring 152, brush 155, wire 344, normally closed contact R3a to the negative wire 326, energizing said relay and said magnet. Contact R40a closes, extending a holding circuit from wire 335 and said contact to the relay R40 and magnet M1. The energization of magnet M1 rocks the armature lever 133 (Fig. 10), releasing the dog 114 of the related storage code member 111a. The nose 115 of this dog drops into the P notch of the related locking wheel 110, locking the code member in the P position. At 320° of rotation of the shaft 293, the contact C2 opens, dropping the relay R30. The contacts R30b open, breaking the circuit of magnet M11, which becomes deenergized, allowing the dog 215 to feed the ratchet wheel 217. The brushes 348 of distributor 347 are fixed upon the shaft of the ratchet wheel 217, indicated in Fig. 30a by the dot and dash line 218'. The lower brush moves from contact 349 of the distributor to contact 350. At 330° the contact C2 closes again. At 350° of shaft 293 contact C1 opens, deenergizing magnet MKL, the contact Pc having opened earlier. This releases the keyboard for operation of the next key. At the end of the revolution of shaft 293, the clutch dog 295 is disengaged and the shaft latches up, magnet MCY having been deenergized previously by the opening of contact Pb.

When the A key is operated the same sequence of events takes place, except that this time the relay R31, pertaining to the A key, is energized and the circuit is extended through contact R31c and the A contact of the emitter 101 to the distributor 347, thence through contact 350, wire 351, relay R41, brush 154 pertaining to the second driving disk 112b, slip ring 151, magnet M2, slip ring 152, brush 155, wire 344, contact R3a, to the negative wire 326, energizing said relay and said magnet. The contact R41a closes, latching up the relay R41 and the magnet M2. The magnet M2 is energized at the time which causes the related locking dog 114 to engage its locking wheel 110 in the A position.

Thus, as the R, I, and S keys are successively operated, the storage code members 111c, 111d, and 111e are stopped and locked in the corresponding angular positions. The lower brush 348 steps forward to contacts 352, 353, 354 in succession, taking one step each time the magnet M11 is deenergized.

In Fig. 30a the groups of brushes 128 which bear upon the commutator sections of the code members are identified by individual numbers from 1 to 25, corresponding to the numbers shown in the left hand space 15 of Fig. 3. The brushes are connected individually by wires 360 to magnets M21—M45 which are the magnets 184 of Fig. 22. The scheme in accordance with which the brushes are connected to the magnets is represented in the two left hand columns of Fig. 24. For example, brush 1 is connected to magnet M21, brush 2 is connected to magnet M26, and brush 6 is connected to magnet M22. The brushes 171—176 whose positions in relation to the readout code members are controlled by the magnets 184 (M21—M45) are further identified in Fig. 30b by primed numbers corresponding to the numbers of the brushes 128 connected to their respective magnets. For example, brush 1' is controlled by the magnet connected to brush 1, brush 6' is controlled by the magnet connected to brush 6, and brush 2' is controlled by the magnet connected to brush 2. It will be seen presently that this arrangement will have the effect of causing the pattern in window 15 of Fig. 3 to be read out transversely into the readout code members, each horizontal row of the pattern being read into a different code member.

Returning now to the example, when the storage code members have been set, the following brushes 128 will be in contact with metallic spots 126 of the code members (compare Fig. 3): 2, 3, 4, 5, 7, 8, 11, 12, 14, 15, 16, 18, 22, 24.

At 320° of the fifth cycle, during which the letter S w stored, the contact C2 opens, the magnet M11 is deenergized, and the brushes 248 move onto the contacts 355 and 356, completing a circuit from wire 324, through wire 335, contact 356, brushes 348, contact 355, wire 357, relay R1, wires 358 and 344, contact R3a, to wire 326, energizing said relay. Contact R1a closes, completing a circuit from wire 335, through said contact R1a, wires 359 and 342 to magnet M11, energizing said magnet. Contact R1b closes, completing a circuit from wire 335, through said contact R1b, to wire 337, through which current is being supplied at the time to magnet MKL, by way of contact C1. Thus, when the latter contact opens at 350° of the fifth cycle, the magnet MKL will remain energized.

Contact R1c closes, completing a circuit from wire 335, through said contact R1c, wire 359, normally closed contact R4b, wire 361, brushes 128 to the continuous rings 125 of the code members 111a—111e. Here the circuit branches through the brushes 128, previously mentioned, which are standing on metallic spots 126, through the wires 360 connected to said brushes, through the magnets M23, M24, M26, M27, M28, M30, M31, M32, M34, M36, M38, M40, M41 and M43, and through wires 362, 363, normally closed contact R20a, to wire 326, energizing said magnets. The brushes 11', 16', 2', 7', 12', 22', 3', 8', 18', 4', 14', 24', 5', and 15' are shifted to zone L, while the other brushes remain on zone R. It will be recalled (see Fig. 22) that there are actually three independent, identical sections 167, 168 and 169 of each translating cylinder, each comprising a left zone and a right zone, but in Fig. 30b these are shown as one section having left and right hand zones.

Returning now to the time when contact R1c closes, a circuit also extends through this contact to relay R2 and through wires 364 and 344 and contact R3a, to wire 326. The relay R2 is retarded and becomes energized after the brushes 1'—25' have been set. When contact R2a (Fig. 30b) closes, a circuit is extended from wire 324, through said contact and wire 365 to each of the brushes 1', 2', 3', 4', and 5'. The cylinders 160a–c are revolving in the direction of the arrows 366, and various combinations of spots are passing under the five groups of brushes 171—176. When the cylinder 160a, for example, reaches a certain angular position, there will be metallic spots in zone R at brushes 21', 6' and 1', and in zone L at brushes 16' and 11'. This agrees with the setting of the brushes and the circuit will be extended from brush 1' through the metal ring 165 (Fig. 22) of section 169, to brush 6', through wire 367, brush 11', the metal ring 165 of section 168, to brush 16', wire 368, to the upper part (175) of brush 21', the metal ring 165 of section 167, to the lower part (176) of brush 21', wire 369, magnet M6, relay R6, wires 362 and 363, contact R20a, to wire 326, energizing said magnet and said relay. The locking dog 114 (Fig. 22) is released and the code member is stopped and locked in position L. The contact R6a closes, extending a holding circuit for magnet M6 and relay R5 through wire 370 to wire 324.

In a similar way each of the other code members 160b—160e will be stopped and locked in the particular positions 7, I, C, and R, respectively. The order in which the cylinders latch up will vary, but all will have done so within one revolution of the shaft 70 after contact R2a closes. When all of the relays R6—R10 are energized, all of the contacts R6b—R10b (Fig. 30a) will be closed and a circuit will be extended from wire 335, through contact R1c, wire 359, contacts R6b—R10b, in series, and relay R3, to wire 326, energizing said relay. Contact R3b closes, completing a circuit from wire 335, through contact R3b, relay R4, wire 363, contact R20a, to wire 326, energizing said relay. Contact R4a closes a holding circuit from wire 335 to relay R4, while contact R4b opens the readout circuit to the storage code members.

Meanwhile, when relay R3a was energized, contact R3a opened, dropping out the magnets M1—M6 and the relays R40—R44, R1 and R2. When magnets M1—M6 are deenergized, the dogs 114 of all the storage code members are retracted from the locking wheels 110, within one revolution of the shaft 70, and the code members are again set in rotation. The contact R1c opens, breaking the circuits to relays R2 and R3 and magnets M21—M45. Contact R2a opens, breaking the circuit through brushes 171—176. Contact R3a closes. Contact R1a opens, deenergizing magnet M11. The dog 215 feeds the brushes 348 to contact 349 and the long segment 347a. The contact R1b opens, deenergizing the magnet MKL and releasing the keyboard.

The readout of the readout code members begins when the cylinder 160a latches up and without regard to the times at which the other cylinders latch up. When relay R6 is energized, contact R6c closes, completing a circuit from wire 324 (Fig. 30a), through normally closed contact R45a, long segment 372a of distributor 372, brushes 373, contact 374, wire 375, contact R6c, relay R11, and wire 376 to wire 326, energizing said relay. Contacts R11a-f close. The cylinder 160a is locked in the L position, therefore, brushes 196 and 199, in code positions 3 and 6 of the cylinder 160a will be standing on metallic spots 193 (see Figs. 21 and 23). Accordingly, circuits will be extended from contact R6c, through brush 200, metal ring 192, the metallic spots 183 in code positions 3 and 6, brushes 196 and 199, contacts R11d and R11a, the corresponding wires of the group 392, plug wires 383 and 386, magnets M53 and M56, wire 378, plug wire 327, to wire 326, energizing said magnets. In the auto-typewriter (Fig. 26), the operating lever 227 pertaining to the L key drops and actuates its key lever 225, causing an L to be printed. The operating lever 227 also rocks bail 252, closing bail contact BC. This completes a circuit from wire 324 (Fig. 30a), through relay R45, to wire 394; also from wire 324, through magnet M12, to wire 394, thence through plug wire 391, contact BC, wire 328, plug wire 327, to wire 326, energizing said relay and said magnet. Contact R45a opens, dropping out the relay R11 and magnets M53 and M56. Feed lever 211a is retracted and dog 215a ratchets over one tooth of ratchet wheel 217a. As indicated by the dot and dash line 218a, the ratchet wheel 217a and the brushes 373 are mounted on the same shaft. When the operating lever 227 rises, contact BC opens and magnet M12 is deenergized. The right hand brush 373 steps onto contact 377. Relay R45 is also deenergized when contact BC opens, but with a retarded action, which delays closure of contact R45a until the right hand brush 373 has left contact 374, thus preventing a repeat operation of the auto-typewriter through code member 160a.

When contact R45a closes, assuming contact R7c to have closed in the meantime, a circuit is completed from wire 324, through contact R45a, segment 372a, brushes 373, contact 377, wire 395, contact R7c, relay R12, wire 376, to wire 326, energizing said relay. Contacts R12a-f close. The code member 160b is in the "7" position; therefore, brushes 196, 197, 198 and 199 in code positions 1, 4, 5 and 6, will be standing on metal spots 193. Accordingly, circuits will be extended from contact R7c to magnets M51, M54, M55 and M56. The auto-typewriter will be operated to print a 7 and the distributor brush 373 will advance to contact 378.

In a similar manner the code members 160c-e will be read out in succession, the auto-typewriter will print the letters I, C, R and the brush 373 will advance to contact 396. When this occurs, and when contact R45a closes, a circuit is completed from wire 324, through contact R45a, segment 372a, brushes 373, contact 396, relay R19, wires 397, and 363, and contact R20 to wire 326, energizing said relay. Contact R19a closes, completing a holding circuit to relay R19 from wire 335. Contact R19b (Fig. 30b) closes, completing a circuit from wire 324, through said contact, wire 398, normally closed contact R21c, normal contacts RCRb, switch SPC, now closed, plug wire 387, magnet MSP, wires 328 and 327, to wire 326, energizing said magnet. This operates the space bar of the auto-typewriter to insert a space at the end of the group. Another circuit extends from wire 398, through relay R20, normal contacts RCRc, and wire 376, to wire 326, energizing said relay.

Upon energization of relay R20, contact R20a opens, dropping out the relays R6—R10, magnets M6—M10, and relays R19 and R4. Also, contact R20b closes, completing the previously traced circuits of relay R45 and magnet M12, through a path shunting the contact BC. The feed lever 211a is retracted and dog 215a ratchets over another tooth of ratchet wheel 217a. The energization of relay R45 at this time is without significance. When magnets M6—M10 are deenergized, the related dogs 114 are retracted from their locking wheels and the readout code members are set rotating again.

When relay R4 is deenergized contact R4b closes, partially restoring the readout circuit to the storage code members 111a-e. The deenergization of relay R19 allows contact R19b to open, dropping out relay R20. Contact R20b opens, deenergizing relay R45 and magnet M12. One of the brushes 373 then steps onto contact 374. The readout mechanism is now ready to receive a new setting from the storage code members.

It will be observed that as soon as the first five characters have been typed on the manually operated typewriter, the pattern set up on the storage code members is transferred simultaneously to the control magnets of the readout code members and the latter take their settings in the course of one revolution of the shaft 70. Thereupon, the manually operated typewriter is released for further operation, while the setting of the readout code members is being read out into the auto-typewriter. Also, about the time the auto-typewriter completes one group, the storage code members may have completed the storage of the next group and its pattern will be immediately transferred to the control magnets of the readout code members as soon as the relay R4 is deenergized. Thus, while the transfer must occur by groups, the operation of the manually operated typewriter may be almost continuous.

When the carriage of the manually operated typewriter spaces, after the sixty-fifth character of the line is printed, the margin stop 61 (Fig. 32) strikes the stop 63 and closes the contacts CRa and CRb. Through the latter, a circuit is completed from wire 330 (Fig. 30a) to solenoid CRS and wire 322, energizing said solenoid and initiating a carriage return operation of the manually operated typewriter. At this time the keyboard is locked, the magnet MKL being held through contact R1b, after the last character of a group is printed on the manually operated typewriter. This continues long enough to allow the carriage return of the manually operated typewriter to be completed before the keyboard is released.

The closure of contact CRa completes a circuit from wire 330, through contact CRa, plug wire 399, relay RCR, normally closed contact R20a, to the negative wire 326, energizing said relay. Contact RCRa closes, completing a holding circuit for the relay RCR to wire 335. The contact RCRc transfers when the relay RCR is energized preventing the relay R20 from being energized as soon as the contact R19b closes and preparing a circuit to be described presently.

Contact RCRb (Fig. 30b) transfers, preventing a circuit to the spacing magnet MSP from being completed when the relay R19 is energized after printing of the last code character of the final group in the line by the auto-typewriter. Instead, the circuit is extended through plug wire 388 and carriage return magnet MCR, to negative wire 328, energizing said magnet and operating the carriage return key of the auto-typewriter.

As soon as the carriage return key is operated, the lever 265 (Fig. 28) transfers the contact spring CRC. The contact R19b being closed at this time, a circuit is extended through said contact, wire 398, relay R21, wires 400 and 390, transferred contact CRC, to the negative wire 328, energizing said relay. Contact R21a closes, completing an obvious holding circuit for the relay R21, to wire 376. Contact R21c opens, breaking the circuit to magnet MCR. Contact R21b closes, further preparing the previously mentioned circuit including the contacts RCRc. When the carriage of the auto-typewriter reaches the end of its return travel and the lever 265 is restored to normal position, the contact CRC is restored to normal condition and completes a circuit from positive wire 324, through contact R19b, relay R20, transferred contacts RCRc, contact R21b, wire 401, plug wire 389, normal contacts CRC, to negative wire 328, energizing said relay R20. The contact R20a opens, restoring the circuits extending therethrough to normal condition, in the manner previously described.

Decoding

For decoding, the cables 23 and 24 (Fig. 7) are plugged into sockets 27 and 28, respectively, and lever 29 is thrown to position E→N, disengaging clutch 72 and engaging clutch 73. The automatic spacing contact SPC (Fig. 10) opens. The other side of the coding unit which now becomes effective, is a complete electromechanical system similar to the one used for coding, but with certain differences, which will now be pointed out. The sequences on the storage code members correspond to those on the East coding stick, while the sequences on the readout code members correspond to those on the North coding stick. Also, the brushes 128 (Fig. 10) are connected to the magnets 184 (Fig. 22) according to the scheme shown in the two right hand columns of Fig. 24. The reason for this scheme of connections will be found by turning Figs. 1 and 2, 90° counterclockwise, and considering that the bottom row in window 15 of the East coding stick is to be read into the readout code member 160a the second row from the bottom is to be read into code member 160b, etc., also that the sequences travel toward the left as the readout code members rotate.

The code message is typed on the manually operated typewriter, paying no attention to the spaces. The spacing in the clear text appears from the decoding of the message. The six position code on the right hand half of the readout code members is the same as before, with the single exception that the space code 4 replaces the 8 code 1234. Thus, when a readout code member is stopped in this angular position, the space bar of the auto-typewriter is operated, through the permutation mechanism. The switch SPC being open, the magnet MSP is not energized for automatic spacing each time the relay R19 is energized. Since each line of the code message contains 65 characters, the spaces being disregarded, carriage return occurs automatically, in the manner previouly described.

The commutator rings of the storage code members and the readout code members can be replaced by others having different sequences. In fact, the changing of a single storage code member commutator, or the transposition of two storage code member commutators, completely changes the code. If a machine should fall into enemy hands, it would be a matter of no great consequence, because of the ease with which the code can be changed.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a coding device, means to set up an original combination of code elements for each character to be coded, the combinations being composed of at least two different kinds of code elements variously arranged in a fixed number of code positions, means to set up new combinations of code elements by grouping together the code elements in similar code positions of a group of the original combinations, and means to manifest a code character for each of said new combinations.

2. A coding device as described in claim 1, characterized by the fact that for each original combination the relation of the combinations of code elements to the characters depends upon the position of the original combination in the group of original combinations.

3. A coding device as described in claim 1, wherein said means to set up an original combination of code elements for each character to be coded comprises a group of code members each having said code elements arranged therein in a minimal transitive sequence.

4. A coding device as described in claim 1, wherein said means to set up an original combination of code elements for each character to be coded comprises a group of code members each having said code elements arranged therein in a minimal transitive sequence, the order of the code elements being different on each code member.

5. A coding device as described in claim 1, wherein said means to set up new combinations of code elements comprises a group of code members each having code elements arranged thereon in a minimal transitive sequence.

6. A coding device as described in claim 1, wherein said means to set up new combinations of code elements comprises a group of code members each having code elements arranged thereon in a minimal transitive sequence, the order of the code elements being different on each code member.

7. A coding device as described in claim 1, wherein the means to set up original combinations and new combinations of code elements comprise groups of individually settable code members, each having said code elements arranged thereon in a minimal transitive sequence.

8. A coding device as described in claim 1, wherein the means to set up original combinations and new combinations of code elements comprise groups of individually settable code members, each having said code elements arranged thereon in a minimal transitive sequence, the order of the code elements being different on each code member.

9. In a coding device, a revoluble code member having contacts distributed circumferentially thereon, the contacts having a staggered arrangement axially of said code member conforming to a code in which different kinds of code elements are represented by different axial positions of the contacts, a group of brushes for sensing said contacts, said brushes being distributed circumferentially at code element spacing and being adjustable axially of said code member to set up different code combinations, means for revolving said code member, and a circuit including a control device, a voltage source, and said brushes in series, whereby said control device will be operated when said code member turns to an angular position in which each of said brushes bears on a contact.

10. In a coding device, a revoluble cylindrical code member having code element designating means distributed circumferentially thereon, said code element designating means being located on said code member in different axial zones, in conformance with a code in which different kinds of code elements are represented by code element designating means positioned in different axial zones, a group of sensing devices distributed along an arc concentric to said code member so as to sense adjacent arcs of said code member each of the length of one code element designating means, said sensing devices being individually adjustable axially of said code member to condition each one for sensing the code element designating means in a particular zone of said code member, means for revolving said code member, and a control device controlled by said sensing devices so as to be operated when all of said sensing devices sense code element designating means.

11. In a coding device, a revoluble cylindrical code member having code element designating means distributed circumferentially thereon, means for sensing an arc of said code member including a plurality of code element designating means, means for adjusting said sensing means to respond to any one, and only one, of the possible combinations of said code element designating means, means for rotating said code member, and a control device controlled by said sensing means.

12. A coding device as described in claim 11, characterized by the fact that said code element designating means are arranged on said code member in a minimal transitive sequence, so that each movement of said code member through an arc of the length of one code element designating means presents to said sensing means a new combination of code element designating means.

13. In a coding device, a group of code members each having thereon a sequence of code elements, means supporting said code members side by side so that they can be moved individually longitudinally of their sequences, a sensing station at which portions of said sequences are presented in parallel lines, means to move the individual code members to present to said sensing station portions of said sequences composed of combinations of code elements respectively corresponding to characters to be coded, means at said sensing station for sensing new combinations of code elements extending crosswise of said parallel lines, and means controlled by said sensing means for manifesting code characters corresponding, respectively, to said new combinations of code elements.

14. In a coding device, a group of code members each having thereon a sequence of code elements, means supporting said code members side by side so that they can be moved individually longitudinally of their sequences, a sensing station at which portions of said sequences are presented in parallel lines, means to move the individual code members to present to said sensing station portions of said sequences composed of combinations of code elements respectively corresponding to characters to be coded, means at said sensing station for sensing new combinations of code elements extending crosswise of said parallel lines, a second group of indivdually movable code members each having thereon a sequence of code elements including all of the new combinations of code elements that can be sensed crosswise of said parallel lines, means controlled by said sensing means for setting the code members of said second group to positions corresponding, respectively, to the new combination sensed from said first code members, and means controlled by said second group of code members, in dependence upon the positions to which they are set, for manifesting code characters.

15. In a coding device, two groups of code members, each code member having code elements of at least two different kinds distributed thereon so that different combinations of code elements representing different characters can be selected therefrom, the combinations of code elements representing each character on the code members of one group being composed of a fixed number of code elements, the other group of code members including a number of code members equal to said fixed number and the combinations of code elements representing each character on the code members of said other group being composed of a number of code elements equal to the number of code members in said first group, means associated with said first group of code members to select therefrom combinations of code elements, which combinations are respectively identified with characters to be coded, means controlled by said first selecting means to select combinations on the coding members of the second group, each of said latter combinations being composed of one code element from each code member of said first group, and means to manifest the code characters identified by said latter combinations.

16. A coding device as described in claim 15, wherein said code members are movably mounted so that different combinations can be selected by moving the code elements to different positions, the code elements being arranged on said code members in minimal transitive sequences, so that by moving a code member through increments each equal to the length of one code element, a new combination is selected at each increment, until all the possible combinations have been exhausted.

17. In a coding device, two groups of code members, each code member having a sequence of code elements thereon composed of at least two different kinds of code elements, means for selecting from the sequences of one group of code members combinations of code elements, each combination representing a character to be coded, means for selecting from the sequences of the other group of code members combinations of code elements, each combination being composed of one code element from each of said first combinations, and means to manifest code characters identified by the combinations of code elements selected from the sequences of said other group of code members.

18. In a coding device, two groups of code members, each group composed of a number of code members movably mounted side by side, each code member having a sequence of code elements thereon composed of at least two different kinds of code elements, means for selectively positioning the code members of one group to produce a pattern of code elements composed of portions of the sequences of code elements on each code member of the first group, which portions consist of combinations of code elements each identified with a character to be coded, means for positioning the code members of the other group to produce a pattern of code elements composed of portions of the sequences of code elements on said other code members, which portions consist of new combinations of code elements, each new combination consisting of one code element from each of said first combinations, and means to manifest code characters respectively identified with each of said new combinations.

19. In a coding device, a rotatably mounted code member having code elements of at least two different kinds arranged thereon in a ring so as to form a minimal transitive sequence, means including a plurality of sensing devices for sensing said code elements, means for adjusting said sensing devices according to a particular combination of code elements, means for rotating said code member, and means controlled by said sensing devices, on sensing the combination of code elements corresponding to their setting, for stopping said code member in a particular angular position identified with the setting of said sensing devices.

20. In a coding device, a first group of code members for representing characters to be coded, each having thereon a sequence of code elements composed of at least two kinds of code elements, means for selecting from said sequences original combinations of code elements, each original combination representing a character to be coded, a second group of independently rotatably mounted code members each having code elements of the same kinds as said first code members arranged thereon in a ring so as to form a minimal transitive sequence on each code member, means including a group of sensing devices for each code member of said second group for sensing the code elements thereon, means for adjusting said groups of sensing devices according to particular new combinations of code elements, each new combination composed of a code element from each of said original combinations, means for rotating the code members of said second group, means controlled by said sensing devices, on sensing the combinations of code elements corresponding to their respective settings, for stopping said rotating code members individually at angular positions identified with the settings of the respective groups of sensing devices, and means to manifest code characters identified with said angular positions of the code members of said second group.

RAY E. GILMAN.

REFERENCES CITED

The following references are of record in the file of this patent:

UNITED STATES PATENTS

| Number | Name | Date |
| --- | --- | --- |
| 50,946 | Myer | Nov. 14, 1865 |
| 1,510,441 | Hebern | Sept. 30, 1924 |
| 1,683,072 | Hebern | Sept. 4, 1928 |
| 1,953,829 | Morris | Apr. 3, 1934 |
| 2,413,592 | Strother | Dec. 31, 1946 |
| 2,425,518 | Doty | Aug. 12, 1947 |